United States Patent
Packes, Jr. et al.

(10) Patent No.: US 8,298,063 B2
(45) Date of Patent: *Oct. 30, 2012

(54) SYSTEM AND METHOD FOR APPLYING LOTTERY MULTIPLIERS

(75) Inventors: John M. Packes, Jr., Hawthorne, NY (US); Stephen C. Tulley, Stamford, CT (US); James A. Jorasch, Stamford, CT (US); Daniel E. Tedesco, New Canaan, CT (US); Magdalena Mik, Greenwich, CT (US); Jay S. Walker, Ridgefield, CT (US); Steven M. Santisi, Stamford, CT (US)

(73) Assignee: Walker Digital, LLC, Stamford, CT (US)

(*) Notice: Subject to any disclaimer, the term of this patent is extended or adjusted under 35 U.S.C. 154(b) by 175 days.

This patent is subject to a terminal disclaimer.

(21) Appl. No.: 12/820,632

(22) Filed: Jun. 22, 2010

(65) Prior Publication Data
US 2010/0261516 A1 Oct. 14, 2010

Related U.S. Application Data

(63) Continuation of application No. 11/425,416, filed on Jun. 21, 2006, now Pat. No. 7,740,537, which is a continuation of application No. 10/916,828, filed on Aug. 12, 2004, now abandoned, which is a continuation of application No. 09/525,875, filed on Mar. 14, 2000, now Pat. No. 6,969,318.

(51) Int. Cl.
A63F 9/24 (2006.01)

(52) U.S. Cl. ............................ 463/17; 463/42

(58) Field of Classification Search .............. 463/17, 463/42
See application file for complete search history.

(56) References Cited

U.S. PATENT DOCUMENTS

| | | |
|---|---|---|
| 4,494,197 A | 1/1985 | Troy et al. |
| 4,624,459 A | 11/1986 | Kaufman |
| 4,723,212 A | 2/1988 | Mindrum et al. |
| 4,760,247 A | 7/1988 | Keane et al. |
| 4,815,741 A | 3/1989 | Small |
| 4,876,592 A | 10/1989 | Von Kohorn |
| 4,882,473 A | 11/1989 | Bergeron et al. |
| 4,893,816 A | 1/1990 | Levy et al. |
| 4,993,714 A | 2/1991 | Golightly |
| 5,158,293 A | 10/1992 | Mullins |
| 5,186,463 A | 2/1993 | Marin et al. |
| 5,259,616 A | 11/1993 | Bergmann |

(Continued)

FOREIGN PATENT DOCUMENTS
EP 0 521 599 A1 1/1993
(Continued)

OTHER PUBLICATIONS

Notice of Allowance for U.S. Appl. No. 09/525,875 mailed Mar. 15, 2005, 9 pp.

(Continued)

*Primary Examiner* — Pierre E Elisca
(74) *Attorney, Agent, or Firm* — Michael D. Downs; Fincham Downs, LLC

(57) ABSTRACT

Some systems, processes, apparatus and articles of manufacture provide for selling lottery entries. In one example, a request is received to purchase a multiplier and a set of play indicia for a lottery game.

14 Claims, 11 Drawing Sheets

U.S. PATENT DOCUMENTS

| | | | |
|---|---|---|---|
| 5,476,259 A | | 12/1995 | Weingardt |
| 5,613,679 A | | 3/1997 | Casa et al. |
| 5,644,704 A | * | 7/1997 | Pease et al. ............ 714/42 |
| RE35,864 E | | 7/1998 | Weingardt |
| 5,882,261 A | | 3/1999 | Adams |
| 5,890,962 A | | 4/1999 | Takemoto |
| 6,146,272 A | | 11/2000 | Walker et al. |
| 6,217,448 B1 | | 4/2001 | Olsen |
| 6,267,670 B1 | | 7/2001 | Walker et al. |
| 6,276,670 B1 | | 8/2001 | Jacobs |
| 6,416,408 B2 | | 7/2002 | Tracy et al. |
| 6,582,304 B2 | | 6/2003 | Walker et al. |
| 6,648,753 B1 | | 11/2003 | Tracy et al. |
| 6,656,048 B2 | | 12/2003 | Olsen |
| 6,887,153 B2 | | 5/2005 | Walker et al. |
| 7,600,251 B2 | * | 10/2009 | Gatto et al. ............ 726/1 |
| 2003/0195033 A1 | * | 10/2003 | Gazdic et al. .......... 463/20 |
| 2005/0282637 A1 | * | 12/2005 | Gatto et al. ............ 463/42 |
| 2006/0094509 A1 | * | 5/2006 | Michaelson et al. ...... 463/42 |
| 2006/0166729 A1 | * | 7/2006 | Saffari et al. .......... 463/17 |

FOREIGN PATENT DOCUMENTS

| | | |
|---|---|---|
| WO | WO 98/43149 | 10/1998 |
| WO | WO 02/38233 | 5/2002 |

OTHER PUBLICATIONS

Office Action for U.S. Appl. No. 09/525,875 mailed Apr. 1, 2004, 6 pp.

Office Action for U.S. Appl. No. 09/525,875 mailed Mar. 25, 2003, 7 pp.

Office Action for U.S. Appl. No. 09/525,875 mailed Jun. 28, 2002, 7 pp.

Office Action for U.S. Appl. No. 10/916,826 mailed Dec. 20, 2007, 9 pp.

Office Action for U.S. Appl. No. 10/916,826 mailed Apr. 16, 2007, 7 pp.

Office Action for U.S. Appl. No. 10/916,826 mailed Dec. 8, 2006, 7 pp.

Office Action for U.S. Appl. No. 10/916,826 mailed Jun. 30, 2005, 8 pp.

Office Action for U.S. Appl. No. 10/916,828 mailed Apr. 3, 2009, 9 pp.

Notice of Allowance for U.S. Appl. No. 10/916,828 mailed Oct. 3, 2008, 6 pp.

Office Action for U.S. Appl. No. 10/916,828 mailed Jun. 25, 2008, 6 pp.

Office Action for U.S. Appl. No. 11/425,416 mailed Oct. 3, 2007, 5 pp.

Office Action for U.S. Appl. No. 11/425,422 mailed Oct. 3, 2007, 5 pp.

Office Action for U.S. Appl. No. 11/425,416 mailed Jul. 30, 2008, 9 pp.

Office Action for U.S. Appl. No. 11/425,416 mailed Dec. 15, 2008, 12 pp.

Office Action for U.S. Appl. No. 11/425,422 mailed Jul. 31, 2008, 7 pp.

Vejnoska, Jill, "Georgia Powerball; Confusion or cash awaits game players", The Atlanta Journal and Constitution, Sep. 2, 1995, Section: Local News, p. 2C, 2 pp.

"First Double Lotto Jackpot Pays Out Big; search is on for Million Ticket Holder", PR Newswire, Sep. 12, 1996, state and Regional News, 2 pp.

"Ante Upped on Lottery", The News Tribune, Jun. 24, 1996, Section: Editorial, p. 46, 1 page.

"State's First Double Lotto Winner Heading for Vegas; $16 Million Ticket Holder Claims Prize Today", PR Newswire, Sep. 16, 1996, Section: State and Regional News, 2 pp.

Bjorhus, Jennifer, "Redmond pair win $16 million", Seattle Times, Sep. 17, 1996, 2 pp.

"In Brief", The Columbian, Nov. 18, 1996, Section: Region/Nation/World; p. A3, 2 pp.

"Double Lotto Winner Collecting $8 Million", PR Newswire, Nov. 26, 1996, Section: State and Regional News, 2 pp.

Broom, Jack, "Lotto Payouts All at Once?—Higher Jackpots also Proposed as Sales Take Nosedive", The Seattle Times, Apr. 29, 1997, Section: News, p. A1, 2 pp.

Perlman, Ellen, "Moves to Lump-Sum Payouts", Governing Magazine, Jul. 1997, Section: Economic Development Briefing, p. 46, 1 page.

"Oceanside Marine Celebrates Independence Day With a Double Spin and $100,000", Business Wire, Jul. 5, 1997, 3 pp.

Babington, Charles, "Md. Trying to Attract More Lottery Players", The Washington Post, Sep. 24, 1997, Section: Metro; p. B01, 2 pp.

Dunne, James, "Double Delight With Over the Odds Lotto", The Mirror, Mar. 3, 1999, Section: News; p. 8, 2 pp.

Office Action for U.S. Appl. No. 11/425,416 mailed Aug. 19, 2009, 13 pp.

Notice of Allowance for U.S. Appl. No. 11/425,416 mailed Mar. 29, 2010, 12 pp.

Notice of Allowance for U.S. Appl. No. 11/425,426 mailed Aug. 21, 2009, 7 pp.

Office Action for U.S. Appl. No. 11/425,426 mailed Aug. 21, 2009, 7 pp.

Office Action for U.S. Appl. No. 11/425,426 mailed Jun. 24, 2008, 6 pp.

Office Action for U.S. Appl. No. 10/916,828 mailed Nov. 24, 2009, 8 pp.

Notice of Allowance for U.S. Appl. No. 11/425,422 mailed Dec. 3, 2008, 9 pp.

Plaintiff Walker Digital, LLC's Opposition to Defendant Multi-State Lottery Association's Motion to Dismiss, *Walker Digital, LLC v. Multi-State Lottery Association*, C.A. 10-cv-1113 (Del. Feb. 15, 2011), 24 pp.

Defendant's Reply Brief in Support of Motion to Dismiss, *Walker Digital, LLC v. Multi-State Lottery Association*, C.A. 10-cv-1113 (Del. Feb. 25, 2011), 15 pp.

Answer Multi-State Lottery Association's Answer to Amended Complaint, *Walker Digital, LLC v. Multi-State Lottery Association*, C.A. 10-cv-1113 (Del. Jan. 27, 2012), 14 pp.

Walker Digital's Opening Claim Construction Brief, *Walker Digital, LLC v. Multi-State Lottery Association*, C.A. No. 10-1113-RGA, United States District Court, (Del. Apr. 10, 2012), 25 pp.

Opening Claim Construction Brief of Multi State Lottery Association, C.A. No. 10-1113-RGA, United States District Court, (Del. Apr. 10, 2012), 27 pp.

Walker Digital's Responsive Claim Construction Brief, C.A. No. 10-1113-RGA, United States District Court, (Del. Apr. 24, 2012), 22 pp.

Responsive Construction Claim Brief of Multi State Lottery Association, C.A. No. 10-1113-RGA, United States District Court, (Del. Apr. 24, 12), 26 pp.

Markman Hearing Transcript, C.A. No. 10-1113-RGA, United States District Court, (Del. May 16, 2012), 49 pp.

Memorandum Opinion, *Walker Digital, LLC v. Multi-State Lottery Association*, C.A. No. 10-1113 (Del. Jun. 7, 2012), 9 pp.

Defendant Multi-State Lottery Association's First Supplemental Objections and Responses to Walker Digital's First Set of Interrogatories to Multi-State Lottery Association, *Walker Digital, LLC v. Multi-State Lottery Association*, C.A. 1:10-cv-1113 (Del. Oct. 18, 2011), 1621 pp.

* cited by examiner

| | PURCHASE DATE 3C1 | DRAWING DATE 3C2 | DRAWING IDENTIFIER 3C3 | BATCH IDENTIFIER 3C4 | MULTIPLIER 3C5 | TICKET IDENTIFIER 3C6 | VIRN 3C7 | PLAYER-SELECTED LOTTERY NUMBERS (PLAY INDICIA) 3C8 | MULTIPLIER PURCHASE PRICE 3C9 |
|---|---|---|---|---|---|---|---|---|---|
| 3R1 → | JAN-3-99 | JAN-6-99 | 1699A | 567 | 2X | DRAW-2345 | -- | 1-2-3-4-5-6 | $1.00 |
| | | | | | | DRAW-2346 | -- | 1-2-7-8-9-20 | |
| 3R2 → | JAN-2-99 | JAN-5-99 | 1599A | 456 | 4X | DRAW-1234 | -- | 20-21-22-23-24-25 | $1.50 |
| | | | | | | DRAW-1234 | -- | 20-21-22-23-24-26 | |
| | | | | | | DRAW-1234 | -- | 20-21-22-23-24-27 | |
| | | | | | | DRAW-1234 | -- | 20-21-22-23-24-28 | |
| | | | | | | DRAW-1234 | -- | 20-21-22-23-24-29 | |
| 3R3 → | JAN-1-99 | INSTANT | -- | 345 | 2X | INST-1111 | 1001 | -- | $1.20 |
| | | | | | | INST-2222 | 2002 | -- | |
| | | | | | | INST-3333 | 3003 | -- | |
| | | | | | | INST-4444 | 4004 | -- | |
| 3R4 → | DEC-31-98 | JAN-4-99 | 1499A <u>A</u> | 234 | 3X | DRAW-7654 | -- | 6-5-4-3-2-1 <u>A</u> | $0.60 |
| | | | 1499B <u>B</u> | | | DRAW-7654 | -- | 15-14-13-12-11-10 <u>B</u> | |
| | | | | | | DRAW-7654 | -- | 5-4-3 <u>C1</u>  2X  <u>C2</u> | |
| 3R5 → | DEC-30-98 | INSTANT | -- | 123 | -- | INST-5555 | 5005 | -- | -- |
| | | | | | | INST-6666 | 6006 | -- | |
| | | | | | | INST-7777 | 7007 | -- | |
| 3R6 → | DEC-29-98 | JAN-3-99 | 1399A | 012 | 1.5X | DRAW-8888 | -- | 1-2-4-5-8-10 | $0.30 |

| DRAWING DATE 5C1 | DRAWING IDENTIFIER 5C2 | WINNING NUMBERS (PLAY INDICIA) 5C3 | CASH REDEMPTION VALUE ($) 5C4 | | | |
|---|---|---|---|---|---|---|
| | | | 6/6 A | 5/6 B | 4/6 C | 3/6 D |
| JAN-6-99 | 1699A | 1-2-7-8-9-10 | $500K | $20K | $500 | $20 |
| JAN-5-99 | 1599A | 20-22-25-30-32-34 | $500K | $20K | $500 | $20 |
| JAN-4-99 | 1499A | 9-8-7-6-5-4 | $500K | $20K | $500 | $20 |
| JAN-4-99 | 1499B | 5-4-3 | -- | -- | -- | -- |
| JAN-3-99 | 1399A | 1-3-5-7-9-11 | $500K | $20K | $500 | $20 |

| TICKET IDENTIFIER 6C1 | BATCH IDENTIFIER 6C2 | VIRN 6C3 | DRAWING IDENTIFIER 6C4 | REDEMPTION VALUE 6C5 | REDEMPTION STATUS 6C6 |
|---|---|---|---|---|---|
| DRAW-2346 | 567 | -- | 1699A | $20K (5/6) | REDEEMED |
| DRAW-6432 | -- | -- | 1699A | $20K (5/6) | REDEEMED |
| DRAW-1234 | 456 | -- | 1599A | $20 (3/6) | NOT REDEEMED |
| INST-1111 | 345 | 1001 | -- | $5 | REDEEMED |
| INST-2222 | 345 | 2002 | -- | $10 | REDEEMED |
| DRAW-7654 | 234 | -- | 1499A | $20 (3/6) | REDEEMED |
| DRAW-7654 | 234 | -- | 1499B | 2X | REDEEMED |
| INST-5555 | 123 | 5005 | -- | 2X | NOT REDEEMED |
| INST-7777 | 123 | 7007 | -- | $30 | NOT REDEEMED |

SYSTEM AND METHOD FOR APPLYING LOTTERY MULTIPLIERS

CROSS-REFERENCE TO RELATED APPLICATIONS

The present application is a continuation of U.S. patent application Ser. No. 11/425,416 entitled "SYSTEM AND METHOD FOR APPLYING LOTTERY MULTIPLIERS", filed Jun. 21, 2006 and issued as U.S. Pat. No. 7,740,537 on Jun. 22, 2010;

which is a continuation of U.S. patent application Ser. No. 10/916,828, filed Aug. 12, 2004 and now abandoned;

which is a continuation of U.S. patent application Ser. No. 09/525,875 filed Mar. 14, 2000 and issued as U.S. Pat. No. 6,969,318 on Nov. 29, 2005.

The present application is also related to U.S. patent application Ser. No. 10/916,828 filed Aug. 12, 2004 and now abandoned, U.S. patent application Ser. No. 11/425,422 filed Jun. 21, 2006 and issued as U.S. Pat. No. 7,513,825 on Apr. 7, 2009 and U.S. patent application Ser. No. 11/425,426 filed Jun. 21, 2006 and issued as U.S. Pat. No. 7,641,548 on Jan. 5, 2010.

Each of the above-referenced applications is incorporated by reference herein in its entirety.

FIELD OF THE INVENTION

The present invention relates generally to the sale of lottery tickets and, more particularly, to a system and method for distributing multiplier tickets which can be applied to a winning lottery ticket to increase its redemption value.

BACKGROUND

On Apr. 30, 1963, State Representative Larry Pickett succeeded in lobbying the New Hampshire State Legislature and then Governor John King to pass the first state lottery act. After local town and city approval was granted, Lottery tickets went on sale Mar. 12, 1964, thereby marking the beginning of modern lotteries in the United States. The lottery was viewed as a viable and voluntary method of raising revenue for education and in fact, between 1964 and 1999, the New Hampshire State Lottery alone has generated more than half a billion dollars for education.

The early lotteries were mainly drawing-type lotteries in which lottery players selected sets of numbers and then a lottery game provider, such as a state lottery authority, periodically conducted random drawings to determine a winning set of lottery numbers. In 1970, the New Jersey Lottery was the first state to increase the frequency of lottery drawings to a weekly drawing. Presently, there are multiple drawings held daily by lottery game providers for many different drawing-type lottery games—from daily pick-three and pick-four drawings, to Quickdraw™-type games, wherein a drawing is conducted as often as several times an hour.

Since the inception of drawing-type lotteries, thirty-seven other states have initiated and continue to conduct such lotteries. These lotteries have been a tremendous success. For example, the net income of drawing-type lotteries in the United States topped $12.5 billion for the year 1998.

In addition to drawing-type lottery games, instant-type lottery games have become popular and have generated a significant amount of revenue for several lottery jurisdictions. As is well known, instant-type lottery games allow a lottery player to purchase lottery tickets and reveal outcomes that are predetermined by lottery game providers. A typical instant-type lottery ticket includes a set of characters, numbers, symbols, and/or messages printed thereon that are configured in accordance with a particular set of game rules. The characters, numbers, symbols, or messages are for example covered with an opaque material such as latex that may be removed by a lottery player to reveal whether the instant-type lottery ticket is a winning ticket. As with drawing-type lottery games, instant-type lottery games have generated significant sales. For example, national sales of instant-type lottery tickets topped $13.8 billion for the year 1998, thereby positioning instant-type lottery tickets as a major source of revenue for lottery game providers.

Despite the success of the various types of existing lottery games, there exists several inherent disadvantages that prevent lottery game providers from further increasing profits. More specifically, existing lottery games do not enable lottery players to actively participate in influencing the payout amount of a winning lottery ticket. Instead, existing games manipulate probability more than payout.

For example, a lottery player of a drawing-type lottery game receives a predetermined payout based in large part on the probability of having selected a set of numbers drawn by a lottery game provider. Lottery players are generally not permitted to actively participate in determining the amount of payout received for a winning ticket. Similarly, a lottery player of an instant-type lottery game receives a predetermined payout based on matching a particular combination of the several characters, numbers, symbols, or messages of an instant-type lottery ticket that he purchases. Thus, lottery players cannot actively participate in changing the payout amount received for a winning instant-type lottery ticket. For a detailed description of how conventional lotteries operate see "Dr. Z's 6/49 Lotto Guidebook" by Dr. William T. Ziemba et al., 1986, printed by Ronalds Printing, published by Dr. Z Investments Inc., which is hereby incorporated by reference herein.

Another disadvantage associated with the various types of lottery games that has limited further growth is the difficulty that lottery game providers have in maintaining the game players' interest in existing lottery games. As one might expect, many lottery games have a limited life-span during which game players' level of interest in the game is initially quite high but tapers off over time. To retain the participation of game players, lottery game providers must continually introduce new lottery games.

As a negative consequence of introducing new lottery games, however, some lottery players discontinue playing some of the older lottery games in order to participate in the newly introduced games. In such cases, some of the older lottery games often become too expensive to maintain, or otherwise lose popularity among players, and must be discontinued. This results in a substantial expense to lottery game providers in that the unused lottery ticket inventories must be discarded or destroyed, investments in targeted advertisements for the canceled lottery game are abandoned, and other economic losses are incurred.

Attempts have been made to eliminate some of the above described disadvantages. For example, U.S. Pat. No. 5,613,679, filed Nov. 17, 1995 and issued Mar. 25, 1997 to Casa, et al., (hereinafter refer to as "the '679 patent"), discloses a lottery game wherein a primary drawing for wagering lottery players is followed by a secondary drawing for non-wagering public entities such as schools or hospitals. The winning lottery player and winning public entity receive predetermined cash prizes. An object of having the secondary drawing for a non-wagering public entity is to make the cause and effect relationship between the lottery players' participation in the lottery game and the benefit of the lottery game to public entities more tangible to the lottery players. A further object is to more particularly and directly focus the income generated by the lottery to public entities sought to be benefited by the lottery game provider.

In an embodiment of the '679 patent, a lottery player selects a set of numbers. Thereafter, a bonus number is randomly selected by a lottery game provider and appended to the set of numbers. If the set of numbers selected by the player is drawn by the lottery game provider, then the lottery player receives a predetermined payout. In addition, if the random bonus number that was appended by the provider is also drawn by the lottery game provider, then the payout is multiplied by the randomly selected bonus number.

The '679 patent falls short of eliminating the disadvantages associated with the various types of lottery games available. That is, in attempting to maintain the public's interest in existing lottery games, it is erroneously assumed that lottery players are primarily encouraged to participate in lottery games if the players see that a portion of their wagering dollars are going directly to public entities. Furthermore, the addition of a bonus number alone does not significantly encourage lottery players to participate in lotteries. The lottery disclosed in the '679 patent does not allow lottery players to influence the size of the bonus number.

Another attempt to eliminate some of the disadvantages described above included an incentive promotion introduced by the Washington State Lottery as described in an article published in *The News Tribune*, Tacoma, Wash. (Jun. 24, 1996). The article described a "Double Lotto" promotion, where the potential payouts were doubled if lottery players paid one extra dollar over the regular one dollar price of a lottery ticket. This promotion was not always fair to the players because the fixed cost to participate was not based on the potential winnings—the risk versus reward ratio was out of the player's control. Thus, as with the '679 patent, this promotion did not provide enough opportunity for player choice to allow players to effectively and fairly participate in influencing the payouts.

Thus, there exists a need for an improved method for operating lotteries that will enhance existing lottery games and allow the creation of new lottery games that do not adversely affect the sale of, or shorten the life of, existing lottery games. In addition, there is a need for lottery games that encourage lottery players to play lottery games and provide players alternative ways to actively participate in influencing the payout for a winning lottery ticket.

SUMMARY OF THE INVENTION

The present invention includes a system and method to allow a lottery player to increase a payout received for winning a lottery game. A method includes a lottery game provider receiving a request from a lottery player to purchase a multiplier and set of play indicia, and to associate the multiplier with the set of play indicia. Data relating to the set of play indicia and data identifying the multiplier are stored in a memory, wherein the data are logically associated with each other. The set of play indicia has a predetermined purchase price. A purchase price is determined for the multiplier based upon a plurality of factors. Thereafter, the lottery player pays the lottery game provider for the set of play indicia and the multiplier.

The set of play indicia may be for a drawing-type lottery game and defined by at least one of characters, numbers, symbols, patterns, and messages. Alternatively, the set of play indicia may be for an instant-type lottery game and defined by at least one of characters, numbers, symbols, patterns, and messages.

The method can further include transmitting the data relating to the set of play indicia and the data identifying the multiplier between at least one of a lottery server/player terminal pair and a lottery server/lottery terminal pair.

In a preferred embodiment, the purchase price for the multiplier is based on an expected value of a set of play indicia and the magnitude of the multiplier. The expected value of a set of play indicia is based in part upon the probability of a set of play indicia winning, multiplied by the value of winning play indicia, multiplied by a sharing discount.

The multiplier may have a magnitude of at least one of: a fractional number, an integer, and a mixed number. In addition, the multiplier may be applied to the redemption value of a set of play indicia based upon the outcome of a particular event or condition. In other words, the multiplier magnitude may vary based on at least one of: the location from which the set of play indicia is purchased, the value of the set of play indicia, the type of lottery game, the outcome of one or more external events, and a predetermined time frame. Furthermore, the multiplier may have a magnitude of one (1) when the value of the set of play indicia falls outside a range between certain predetermined values. In other words, the multiplier can be rendered ineffective if, for example, the winnings exceed a certain predefined amount.

The method may further include inputting the data relating to the set of play indicia and the data identifying the multiplier, wherein the step of inputting the data may include at least one of: scanning a bar code configured to represent the data, keying in the data, and receiving the data from a terminal, a server, and/or a network.

In addition, the present invention includes a method for a lottery game provider to receive a set of play indicia that had been previously associated with one or more multipliers from a lottery player. Data relating to the set of play indicia is stored in a memory. The data relating to the set of play indicia is then compared with data identifying a winning set of play indicia to determine a value for the set of play indicia. The value of the set of play indicia is applied to the multiplier to determine a payout. Thereafter, the lottery game provider pays the lottery player the payout.

The present invention also includes a computer-readable storage medium encoded with processing instructions for directing a computer to store data relating to a set of play indicia in a database file that identifies sets of play indicia. In addition, data identifying a multiplier is stored in a field of the database file that identifies multipliers. The set of play indicia is thus associated with the multiplier. Thereafter, the purchase price of the multiplier is calculated.

Furthermore, the present invention includes a computer-readable storage medium encoded with processing instructions for directing a computer to store data relating to a set of play indicia in a memory. Data identifying a winning set of play indicia is then retrieved and also stored in the memory. The data relating to the set of play indicia is compared with the data identifying the winning set of play indicia to determine a value for the set of play indicia. It is then determined whether a multiplier is associated with the set of play indicia. Thereafter, the value of the set of play indicia is established in accordance with the multiplier.

The present invention also includes a computer system having a memory for storing data related to a lottery game and having a processor in communication with the memory. The processor is operative to store data in the memory, the data identifying a first set of play indicia, a second set of play indicia, and a multiplier. Further, the processor is operative to associate the first set of play indicia and the second set of play indicia with the multiplier and to calculate a purchase price for the multiplier. The present invention further includes a lottery ticket for use with the systems and methods of the present invention.

These and other systems and methods are illustrated in the appended Figures and described below in the detailed description of the embodiments of the present invention.

BRIEF DESCRIPTION OF THE DRAWINGS

So that those of ordinary skill in the art to which the subject invention pertains will more readily understand how to make and use the system and method described herein, preferred embodiments of the invention will be described in detail with reference to the following drawings, wherein:

FIG. 3 is a sample table illustrating exemplary contents and structure of an example of a registration database that is configured in accordance with an embodiment of the present invention;

FIG. 5 is sample table that illustrates exemplary contents and structure of a winning numbers database that is configured in accordance with an embodiment of the present invention;

FIG. 6 is an example of a table that illustrates the contents of a winning tickets database that is configured in accordance with an embodiment of the present invention;

DETAILED DESCRIPTION OF THE PREFERRED EMBODIMENTS

Figure 1:
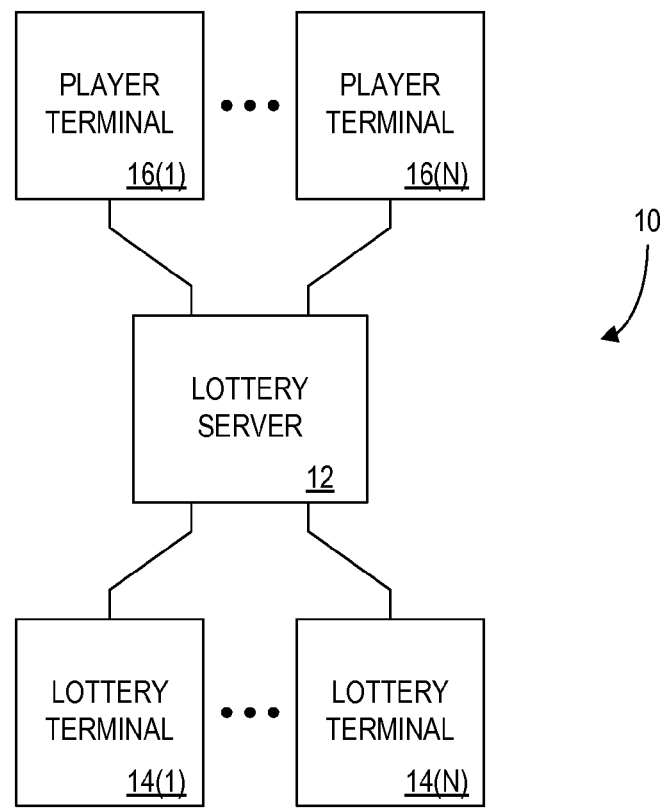
FIG. 1 is a block diagram of an example of a network that could be used in an embodiment of the present invention.

Reference is now made to the accompanying Figures for the purpose of describing, in detail, the embodiments of the present invention. The Figures and accompanying detailed description of the embodiments are provided as examples of the invention and are not intended to limit the scope of the claims appended hereto.

The present invention provides a novel and unique system and method that will benefit lottery game providers, lottery retailers, and lottery players. Generally, the present invention provides a system and method for a lottery player to obtain (e.g. purchase and/or win) a multiplier that may be applied to the monetary or other redemption value of a winning lottery ticket to affect the payout awarded for the winning lottery ticket. (Note that there are embodiments of the present invention that are described below in which the payout for a winning lottery ticket decreases as a result of a multiplier being applied to the redemption value.) Those skilled in the art will readily appreciate that the present invention can be applied to any type of lottery game. However, for the sake of brevity, the examples discussed below will be described using basic drawing-type lottery game and basic instant-type lottery game embodiments.

A. DEFINITIONS

Throughout the description that follows, the term "multiplier" shall refer to a multiplication operator (i.e. "X") and a fractional number (e.g., "¼", "½", "¾", "0.9"), an integer (e.g., "1", "2", "–3", "0"), or a mixed number (e.g., "1¼", "4.666", "1½", "2¾") that may be obtained (e.g., purchased or won) by a lottery player and applied to (for example, multiplied by) the value of a winning lottery ticket. The terms "multiplier magnitude", "multiplier size" and "multiplier amount" shall be considered to have the same definition which is the numeric value portion of the multiplier (e.g., the "4" is the magnitude of a "4×" multiplier).

The terms "redemption value" and "value" shall refer to any type of prize that can be awarded to a lottery player. As used herein, such an award will usually be either a monetary amount or a multiplier. However, a redemption value can include anything with a value such as an automobile or even additional play indicia. The term "case redemption value" shall refer to an award of a monetary amount. The term "payout" shall refer to an actual amount of value to be given to a lottery player. More specifically payout refers to the final sum to be paid to a player once a multiplier has been applied to a redemption value.

The term "lottery ticket" or "ticket" shall refer to any type of ticket, including an electronic representation of a ticket, used in any type of lottery game offered by a lottery game provider. As noted above, there are two basic types of lottery games that are popular—drawing-type lottery games and instant-type lottery games. These lottery games include any number of variations and combinations. The present invention can be applied to these and other types of lottery games. The term "drawing-type lottery ticket" shall refer to a lottery ticket for a drawing-type lottery game.

The term "instant-type lottery ticket" shall refer to a lottery ticket for an instant-type lottery game.

The term "ticket identifier" shall refer to an identification code, for example, a bar code or a series of alphanumeric characters that is used to uniquely identify a lottery ticket.

A lottery ticket may be formed as one or more cards which are made of paper, cardboard, plastic, or any other suitable material and include identification and game playing information printed thereon. Alternatively, lottery tickets may be represented magnetically, optically, or electronically. For example, lottery tickets may be represented as electronic characters or images in a memory or on a video monitor that are generated and stored on a computer or other portable information device. Furthermore, electronic lottery tickets may be used in a lottery game conducted over a computer network such as the Internet. Further, tickets may be embodied as magnetic stripes on cards, patterns on magneto-optical media, and/or bit patterns in a smart card or electronic, magnetic, or optical circuit.

The term "drawing-type lottery game" shall refer to a particular type of lottery game, wherein lottery players purchase lottery tickets which each include one or more sets of characters thereon. A lottery ticket for a drawing-type lottery game may include play indicia, for example, that includes a set of six numbers selected from the numerals in the range between one and forty-four, inclusive. Lottery tickets are typically purchased from lottery providers through lottery ticket retailers at a fixed price. Examples of lottery ticket retailers include convenience stores, delicatessens, markets, supermarkets, and online lottery web sites.

Lottery game providers, such as the New Jersey Lottery, typically authorize and support lottery ticket retailers' sale of lottery tickets. At a typical drawing held by a lottery game provider, six numeric characters are randomly drawn. Participating lottery players compare the numeric characters on their lottery tickets acquired before the drawing with those numeric characters selected at the drawing. The lottery players possessing a ticket with a sufficient number of matching numeric characters as defined by the particular lottery's rules, win a prize (typically a monetary prize) also as defined by the lottery's rules.

The term "instant-type lottery game" shall refer to lottery games that utilize lottery tickets which may be purchased and altered in order to reveal whether a monetary prize has been won. These lottery tickets usually have characters, numbers, symbols, or messages printed thereon that lottery players expose by removing an opaque coating such as a latex compound. Instant-type lottery tickets may alternatively utilize pull-tabs to cover the characters, numbers, symbols, or messages.

An example of an instant-type lottery game includes a lottery ticket having nine characters, numbers, symbols, or messages arranged thereon as a three-by-three matrix, wherein a ticket having three like symbols in any vertical, horizontal, or diagonal row is considered a winning lottery ticket. Another example of an instant-type lottery game includes a lottery ticket that simulates the play of a conventional bingo game. Such a lottery game is described in U.S. Pat. No. 5,641,167 filed Jul. 22, 1994 and issued Jun. 24, 1997 to Behm, et al., the content of which is incorporated herein by reference.

The term "play indicia" shall refer to a character, number, symbol, or message on either a drawing-type lottery or an instant-type lottery ticket. The term "lottery numbers" is used synonymously with the term "play indicia" herein.

Figure 4A:
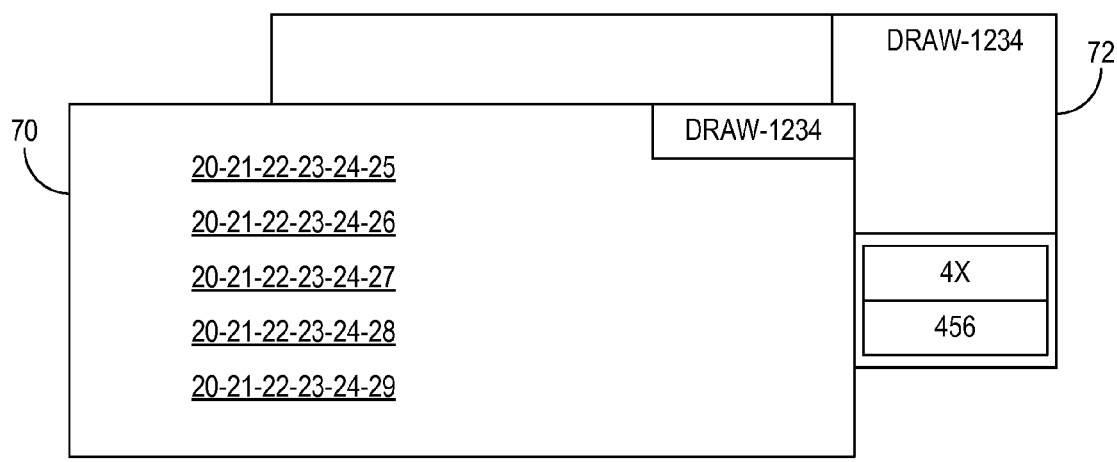
FIG. 4A is an example depiction of lottery tickets that could be used with some of the embodiments of the present invention.
Figure 4B:
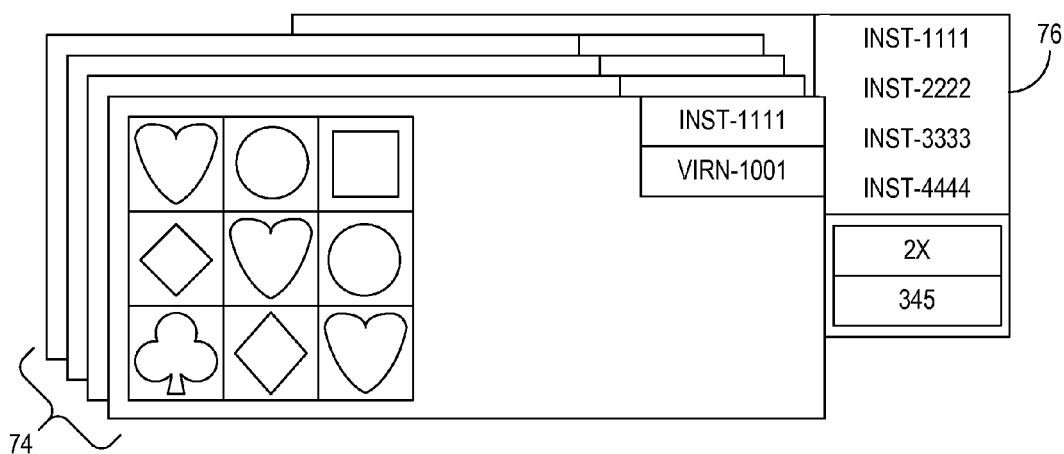
FIG. 4B is an example depiction of lottery tickets that could be used with some of the embodiments of the present invention.

The term "set of play indicia" shall refer to sufficient play indicia to allow a lottery player to participate in at least a single play of a particular type of lottery game. For example, in a six number drawing-type lottery game, six numbers represent a set of play indicia. FIG. 4A of the present application illustrates one embodiment of a lottery ticket for such a drawing-type lottery game. Furthermore, in a three-by-three instant-type lottery game, nine characters, numbers, symbols, or messages may be considered a set of play indicia. FIG. 4B of the present application illustrates one embodiment of a lottery ticket for such an instant-type lottery game. The terms "set of numbers" and "set of lottery numbers" are used synonymously with the term "set of play indicia" herein.

The term "subset of play indicia" shall refer to a portion of the set of play indicia sufficient to allow a lottery player to possibly win a prize in at least a single play of a particular type of lottery game. For example, in the six number drawing-type lottery game mentioned above, there is typically a prize awarded for matching three, four, five, or six of the drawn lottery numbers. In such a game, three lottery numbers or play indicia would represent one example of a subset of play indicia.

Those skilled in the art will readily appreciate that a single lottery ticket may include several sets of play indicia. For example, a single drawing-type lottery ticket may include five sets of play indicia, thereby providing a lottery player five opportunities to match the set of lottery numbers drawn by a lottery game provider. FIG. 4A illustrates a drawing-type lottery ticket that includes five sets of play indicia printed thereon.

The term "multiplier set of play indicia" shall refer to a set of play indicia having a multiplier, instead of a monetary or other prize, as a redemption value. The magnitude of the multiplier that is awarded for a winning multiplier set of play indicia may not be known to the player beforehand or it may be selected by the player at the time he purchases the multiplier set of play indicia. Alternatively, the magnitude of the multiplier that is awarded may be determined by an external condition such as the level of a stock market or the outcome of a professional sporting event.

The term "multiplier ticket" shall refer to a ticket that includes information thereon for identifying a multiplier that is purchased or won by a lottery player. In addition, a multiplier ticket may include one or more ticket identifiers that identify lottery tickets. As noted above, the term multiplier refers to a fractional number, an integer, or a mixed number combined with a multiplication operator that may be purchased by a lottery player and applied to the value of a winning lottery ticket. A multiplier ticket can include one or more sets of play indicia.

Multiplier tickets may be formed as one or more cards or portions thereof which are made of paper, cardboard, plastic, or any other suitable material. Alternatively, multiplier tickets can be represented electronically. For example, multiplier tickets may be represented as electronic characters or images in a memory or on a video monitor that are generated and stored on a computer or other portable information device. Furthermore, electronic multiplier tickets may be used in a lottery game conducted over a computer network such as the Internet.

The term "winning lottery ticket" shall refer to a lottery ticket that has a redemption value after a lottery drawing or play, for example. The term "losing lottery ticket" shall refer to a lottery ticket that has no value after a lottery drawing or play. A drawing-type lottery ticket will have a redemption value and will therefore be considered a winning lottery ticket if a set or subset of play indicia related thereto are drawn by a lottery game provider in accordance with rules set forth by the lottery game provider. An instant-type lottery ticket will have a redemption value and will therefore be considered a winning lottery ticket when for example, a set of play indicia related thereto is arranged in a manner that conforms with the rules of the particular lottery game which define it as such.

The term "void if removed number" (hereinafter referred to as "VIRN") shall refer to an identifier used on instant-type lottery tickets. The VIRNs are found, for example, under the scratch-off latex and are used in conjunction with ticket identifiers to verify the validity of winning instant-type lottery tickets.

The term "batch" shall refer to sets of play indicia, ticket identifiers, multipliers, and/or multiplier sets of play indicia that are logically or otherwise associated with one another. As will become more apparent below, there are several advantages to batching sets of play indicia, ticket identifiers, and/or multipliers. For example, batching facilitates methods of calculating a price for a multiplier. Furthermore, batching prevents lottery players from attempting to apply multipliers to winning lottery tickets purchased by other lottery players, and vice versa. The term "associate" as used herein is synonymous with the term batch.

Tickets may be batched (or associated) at the time they are purchased by lottery players. For example, sets of lottery numbers chosen by a lottery player to play a drawing-type lottery game may be batched prior to (or after) being printed as associated sets of play indicia onto one or more lottery tickets. Likewise, instant-type lottery tickets or sets of characters, numbers, symbols, or messages chosen by a lottery player to play an instant-type lottery game may be batched prior to being purchased. Instant-type lottery tickets may be batched, for example, by scanning bar code information from each instant-type lottery ticket into a lottery terminal. In another example of batching, a player can have several different tickets or sets of play indicia for different types of lottery games with different drawing dates or other play outcome determination events associated together at any time after the purchase but before the play outcome determination events.

The term "apply" (as in "apply a multiplier to a value") shall refer to altering the value based upon the multiplier size and a set of rules that can be defined by a lottery game provider for a particular multiplier or lottery. In a basic embodiment of the present invention, applying a multiplier to value can simply mean multiplying the value by the magnitude of the multiplier. However, in another embodiment, applying a multiplier can include different operations such as multiplying weighted percentages of the multiplier by a set of values associated with the multiplier, for example.

B. THE SYSTEM

Referring now to the Figures wherein like reference numerals identify similar elements, there is illustrated in FIG. 1 a block diagram of an example system 10. System 10 can include a lottery server 12 which may be under the control of a lottery game provider such as the New Jersey Lottery. In general, the lottery server 12 may include databases which themselves include data supporting one or more lottery games, programs for processing the data, processing and communications hardware, etc. More details concerning the lottery server are provided below.

In communication with the lottery server 12 are one or more lottery terminals 14(1) through 14(N) which are typically operated by lottery retailers such as convenience stores, delicatessens, and markets. Also in communication with the lottery server 12 are one or more player terminals 16(1) through 16(N) which may be operated by lottery players to directly input a request to purchase lottery tickets.

Those skilled in the art will appreciate that any of various different networking systems can be used to provide communication between the lottery server 12, terminals 14(1) through 14(N) and 16(1) through 16(N). Such systems may include, but are not limited to, dedicated point-to-point connections, wireless connections, intranet connections, and Internet connections.

Figure 2:
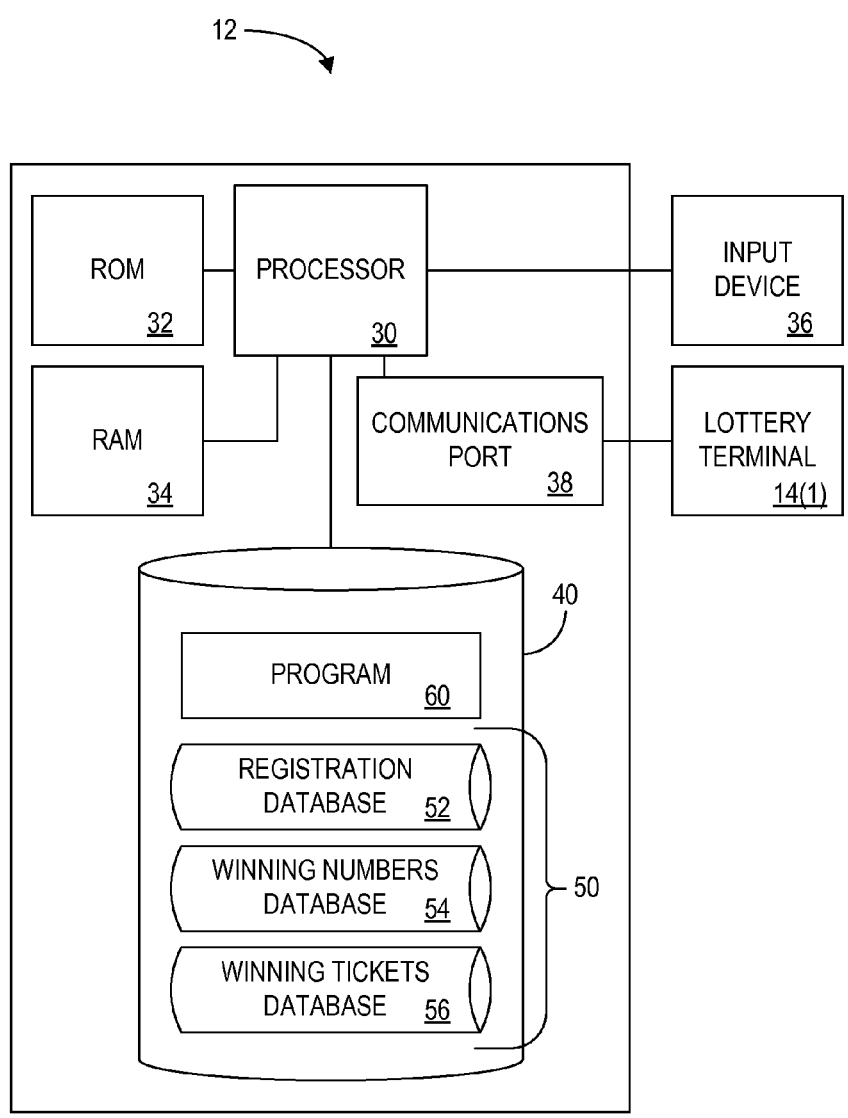
FIG. 2 is a block diagram of an example of the lottery server shown in FIG. 1.

Referring to FIG. 2, a block diagram of the lottery server 12 is shown in communication with lottery terminal 14(1). The lottery server 12 includes a processor 30 which executes application programs of the present invention. Lottery server 12 may also include a read only memory ("ROM") 32 and a random access memory ("RAM") 34, collectively referred to herein as memory. The memory 32, 34 may be used to store at least a portion of the program instructions of the application programs that are to be executed by the processor 30, such as portions of an operating system and for temporary storage of data during processing.

An input device 36 is in communication with processor 30 to permit the entry of data into the lottery server 12. Any of a wide variety of input devices is suitable for this purpose, including, for example, one or more of keyboard, an interactive voice response unit, scanner, and a touch screen. The lottery server 12 further includes a communications port 38, which enables the processor 30 to communicate with devices external to the lottery server 12 such as a lottery terminal 14(1).

The processor 30 stores information to, and reads information from, a storage device 40. The storage device 40 includes database files 50 stored thereon including a registration database 52, winning numbers database 54, and a winning tickets database 56. It should be noted that although the embodiment is illustrated to include three particular databases stored in storage device 40, other database arrangements may be used which would still be in keeping with the spirit and scope of the present invention. In other words, the present invention could be implemented using any of a number of different database files or data structures, as opposed to three, as depicted in FIG. 2. Further the database files could be stored on different servers (e.g. found in different geographic locations). Storage device 40 also preferably includes an application program 60. The application program 60 could also be located remotely from the storage device 40 and/or on another server. The application program 60 includes instructions for retrieving, manipulating, and storing data in the database files 50 as necessary to perform the transactions in the methods of the invention as described below.

C. THE REGISTRATION DATABASE

Referring to FIG. 3, a table illustrates sample contents of an example embodiment of a registration database 52 (FIG. 2). Several embodiments of the present invention are depicted by the records included therein. In addition, reference is made to FIGS. 4A through 4D to facilitate the descriptions of the several embodiments.

Generally, registration database 52 is used to associate, (i.e., batch) sets of play indicia and their related ticket identifiers with one another and with multipliers purchased or won by lottery players. As described above, if a lottery ticket is a drawing-type lottery ticket, the sets of play indicia will be one or more sets of characters or numbers selected by the lottery player when the lottery ticket is purchased. In addition, if the lottery ticket is an instant-type lottery ticket, the sets of play indicia will be one or more sets of characters, numbers, symbols, or messages for the particular game on one or more instant-type lottery tickets.

Batched sets of play indicia are identified by a batch identifier. Batching sets of play indicia, their related ticket identifiers, and multipliers facilitates determination of a purchase price for a multiplier. In addition, batching can be used to prevent lottery players from attempting to apply multipliers to winning lottery tickets from other batches and/or tickets not registered in a batch. In other words, batching provides a method of controlling when a multiplier is associated with a set of play indicia. For example, batching can be used to prevent players from associating a multiplier with a ticket after the player knows that a ticket is a winning ticket. Those skilled in the art will appreciate that the information in the registration database 52 may be uploaded on a periodic basis or in real time to the lottery server 12 from both the lottery terminals 14(1) through 14(N) and the player terminals 16(1) through 16(N).

Registration database 52 is also used to batch or associate sets of play indicia for lottery games wherein a game player may win a multiplier. Examples of such lottery games are described below.

Registration database 52 can include a record for each batch of lottery tickets. In this example, each row (3R1 through 3R6) of the table depicted in FIG. 3 represents a record. Each column (3C1 through 3C9) represents a field within the records. Each record can include a field for a purchase date (3C1), drawing date (3C2), drawing identifier (3C3), batch identifier (3C4), multiplier (3C5), ticket identifier (3C6), VIRN for instant-type lottery tickets (3C7), player-selected lottery numbers (play indicia) for drawing-type lottery tickets (3C8), and the purchase price for all multipliers and multiplier sets of play indicia batched in the record (3C9). It should be understood that alternative data structures using different or fewer fields could be employed to store similar information and to implement the present invention.

Sample data for this embodiment of the present invention is illustrated by record 3R1, wherein on Jan. 3, 1999 (3C1), a lottery player purchased two sets of lottery numbers, i.e., "1-2-3-4-5-6" and "1-2-7-8-9-20" (3C8), on two separate lottery tickets, "DRAW-2345" and "DRAW-2346" (3C6), for a drawing to be held on Jan. 6, 1999 (3C2) that the system identifies with the drawing identifier "1699A" (3C3). Note that, as described above, each set of lottery numbers may be alternatively referred to as a set of play indicia. The lottery player also purchased a "2×" multiplier (3C5) for "$1.00" (3C9) that is associated with the two sets of lottery numbers "1-2-3-4-5-6" and "1-2-7-8-9-20" (3C8) and identified by the system using batch identifier "567" (3C4).

The purchase price of each set of lottery numbers is fixed by the lottery game provider that sponsors the lottery game. For example, the price of each set of lottery numbers may be one dollar. The purchase price of the "2×" multiplier is calculated to be "$1.00" (3C9) based on the principles discussed below. The above transaction resulted in the creation of record 3R1 in registration database 52.

In record 3R1, batch identifier 567 (3C4) is used to associate the sets of lottery numbers "1-2-3-4-5-6" and "1-2-7-8-9-20" (3C8) and their ticket identifiers "DRAW-2345" and "DRAW-2346" (3C6), respectively, with the "2×" multiplier (3C5). If either or both lottery tickets are determined to be winning lottery tickets according to the drawing performed on the Jan. 6, 1999 drawing date (3C2), then the "2×" multiplier could be applied to the larger redemption value of the winning set of lottery numbers. In alternative embodiments of the present invention, the multiplier can be applied, for example, to the smaller value, both redemption values, or to whichever redemption value the player chooses.

D. COMPUTING A MULTIPLIER PURCHASE PRICE

Generally, the purchase price of a multiplier may be based upon the expected value of the sets of play indicia and the magnitude of the multiplier (e.g., "2", "3", "4×", etc.). A sample formula used for calculating the expected value of the sets of play indicia is:

$$E=PVD$$

where E represents the expected value of a play indicia set, P represents the probability of winning the top payout, V represents the value of the top payout and D represents a sharing discount. This formula considers the expected value that results only from the top jackpot payout. More complex formulas can consider the additional expected value resulting from, for example, payouts for partial matches of play indicia sets (the lower value payouts). In this example, the sharing discount is defined as a reduction in the expected value of the top payout to account for the chance that the top payout will be shared among a number of lottery players. An example formula for computing the sharing discount might be:

$$D=E[1/n]$$

where D represents the sharing discount, E[ ] represents an expected value function, and n is a random variable that assigns a probability p(n), to all possible purchase quantities of a particular set of play indicia assuming that at least one set of play indicia is purchased (n≧1). For example, p(n=3)=0.3, indicates that there is a thirty percent chance that a particular set of play indicia will be purchased three times, given that it is purchased at least once. The function E[ ], the expected value function, takes the expected value over its argument. A more simplified formula for the sharing discount would be:

$$D=1/N$$

where N represents the anticipated number of times a particular set of play indicia will be sold, assuming N is the same for all possible sets of play indicia and also assuming the rough approximation that $1/N \cong E[1/n]$. This particular formula for computing a sharing discount is provided as a very basic example of how the potential for a shared jackpot could be used to influence the expected value of a lottery ticket. As indicated above, this particular example formula only considers the probability of winning the grand prize jackpot and not any component of expected value that would result from winning smaller awards for matching a portion of the drawn numbers with a portion of a set of play indicia.

The example sharing discount formula above also attempts to show how the anticipated total number of play indicia sold could be used to influence the expected value. It is important to understand that many other factors could be used to derive an adjustment to the expected value to compensate for a sharing discount or other lottery or context-specific influences.

Regarding the price of a multiplier, the expected value can be adjusted to take into account the magnitude of the particular multiplier sold ("2", "4", "10×", etc.). A very basic example of how this could be achieved would be to simply multiply the expected value by the magnitude of the multiplier minus one:

$$E_M=(X-1)E$$

where $E_M$ represents the expected value of the multiplier applied to the expected value of a set of play indicia, X represents the magnitude of the multiplier, and E represents the expected value of the set of play indicia. A more precise formula could additionally factor in the number of sets of play indicia to which the multiplier can be applied. In other words, if the rules of the lottery allowed a player holding two or more winning tickets from the same batch to apply the multiplier to two or more of the tickets, the expected value of the multiplier would be higher. Likewise, the expected value of the multiplier of a batch would be higher if the number of sets of play indicia in the batch was larger and clearly, this too can be factored into the expected value formula.

Incorporating the example formula for the sharing discount provided above, and multiplying the expected value of a set of play indicia by both the magnitude of the multiplier and the number of sets of play indicia to which the multiplier may be applied, would result in an example formula for the expected value of a multiplier such as:

$$E_M = (X-1)YPVD$$

Upon applying the simplified formula for the sharing discount (D), this formula reduces to:

$$E_M = (X-1)YPV/N$$

where $E_M$ represents the expected value of the multiplier applied to the expected value of a set of play indicia, X represents the magnitude of the multiplier, Y represents the number of sets of play indicia to which the multiplier can be applied, P represents the probability of winning the top payout, V represents the value of the top payout, D represents the sharing discount, and N represents the anticipated number of times a particular set of play indicia that will be sold assuming that at least one of that particular set of play indicia is sold.

It should be understood that in addition to the magnitude of the particular multipliers sold, the number of players who purchased multipliers for a particular drawing could also be used as a factor in adjusting the expected value and/or purchase price of a multiplier. For example, the purchase price of a multiplier may be increased as the number of registered multipliers increases to offset the potentially larger payouts that might become necessary. Alternatively, the purchase price of multipliers may decrease as the money collected from the sale of multipliers that have low expected values increases.

In one embodiment of the multiplier of the present invention, players are provided with an opportunity to win a multiple of the largest payout. It should be noted that this is distinct from a player that hopes to increase his potential winnings by merely purchasing multiple tickets with identical selected play indicia. Such a player can only hope to win a multiple of the redemption value awarded for small awards, those given for matching a portion of the drawn play indicia (e.g., a small payout for matching three out of six numbers chosen). Such a player does not stand to potentially multiply the grand prize jackpot payout as in the case of the present invention. In other words, a player holding three identical grand prize winning tickets only gets three shares of the grand prize jackpot payout. The total number of shares depends upon the total number of jackpot winners. At best three identical grand prize winning tickets wins the original jackpot. In contrast, according to one embodiment of the present invention, a player holding a "3×" multiplier ticket and a grand prize winning ticket receives three times the grand prize jackpot payout. Thus, multipliers are attractive to players and at the same time, multipliers afford the lottery game providers the flexibility to charge more money for a multiplier ticket than can be charged for multiple identical tickets.

Various specific purchase-price formulas can be used or derived for different lottery games offered by lottery game providers. Those skilled in the art will be acquainted with various different possible calculations. One example of a customer purchase-price formula for computing the purchase price of a multiplier would be:

$$C = QE_M$$

where C represents the customer purchase-price of the multiplier, Q represents a lottery game provider mark-up percentage or value, and $E_M$ represents the expected value of a multiplier as defined above. In the example data shown on row 3R1 of the example registration database 52 of FIG. 3, "$1.00" is listed as the multiplier purchase price (3C9). For this example, assume a lottery in which players must pick six numbers out of forty-nine possible numbers to form a play indicia set (hereinafter referred to as a "6/49 lottery"), a single multiplier is only permitted to be applied to a single winning set of play indicia (Y=1), there is an expected grand prize payout of approximately 18.6 million dollars (V=$18,645,088), a lottery markup of 50 percent (Q=1.5), and it is anticipated that based upon the total number of sets of play indicia that are expected to be sold and the number of unique sets of play indicia in a 6/49 lottery, each unique set of play indicia that is purchased will be purchased twice on average (N=2). These assumptions result in a purchase price for a multiplier calculation as follows:

$$\begin{aligned} C &= Q(X-1)YPV/N \\ &= (1.5)(2-1)(1)(1/13{,}983{,}816)(\$18{,}645{,}088)/(2) \\ &= \$1.00 \end{aligned}$$

In this example, the probability of winning the top jackpot in a 6/49 lottery is equal to 1 in 13,983,816 and according to the sample formula discussed above, the approximate sharing discount can be computed as follows:

$$\begin{aligned} D &= 1/N \\ &= 1/2 \end{aligned}$$

Thus, the sharing discount will reduce the expected value of a play indicia set by approximately half. This is because with a larger number of players there is a corresponding increase in the probability of a shared payout, i.e. the chances that there will be two or more winners sharing the jackpot increases as the anticipated number of play indicia sets that will be sold increases.

Thus, the price of a multiplier can be based upon one or more factors including a lottery mark-up value, the magnitude of the multiplier, the number of other multipliers sold, the anticipated number of multipliers that will be sold, the average size of other multipliers sold, the total size of other multipliers sold, the individual sizes of other multipliers sold, the number of lottery players, the total number of play indicia sets sold, the number of unique play indicia sets sold, the anticipated number of play indicia sets that will be sold, the anticipated number of times a particular play indicia set will be sold, the probabilities of each of the possible quantities sold of each of the possible sets of play indicia that are sold, the number of other players, a sharing discount, the number of play indicia sets associated with the multiplier, the number of winning play indicia sets to which the multiplier can be applied, the probability of winning the lottery, the size of the lottery jackpot, a payout table for winning tickets or other system for determining payout amounts, the type of lottery, the rules of the lottery, and other conditions that the lottery authority identifies that will be allowed to effect the expected value of the multiplier.

It is noteworthy that, as shown in record 3R1, neither of the two displayed ticket identifiers are associated with a VIRN (3C7). This is because the tickets are for a drawing-type lottery, not an instant-type lottery, and drawing-type lottery tickets do not typically use VIRNs. In addition, it is noteworthy that the lottery player could have purchased the two drawing-type lottery numbers on a single lottery ticket. An example of such a lottery ticket purchase will now be described.

E. EXAMPLES ILLUSTRATING FURTHER EMBODIMENTS

A second set of example data of an embodiment of the present invention is illustrated by record 3R2 of FIG. 3 in conjunction with FIG. 4A. As illustrated in record 3R2 of FIG. 3, wherein on Jan. 2, 1999 (3C1), a lottery player purchased five sets of lottery numbers (3C8) on a single, drawing-type lottery ticket 70 identified as "DRAW-1234" (3C6) with the drawing identified as "1599A" (3C3) to be held Jan. 5, 1999 (3C2). In addition, the lottery player purchased a "4×" multiplier (3C5) on a multiplier ticket 72 for a batch identified as "456" (3C4). In this example, the price of the "4×" multiplier was determined to be "$1.50" (3C9). The transaction resulted in the lottery player receiving the two lottery tickets illustrated in FIG. 4A and the creation of record 3R2 in registration database 52.

In record 3R2, batch identifier "456" (3C4) associates the five sets of lottery numbers (3C8), their ticket identifier "DRAW-1234" (3C6), and the "4×" multiplier (3C5). The purchase price of each set of lottery numbers is fixed at, for example, one dollar per set. As mentioned above, in this example, the purchase price of the "4×" multiplier for the batch of five tickets is calculated to be "$1.50" (3C9).

A third set of example data of an embodiment of the present invention is illustrated by record 3R3, wherein on Jan. 1, 1999 (3C1), a lottery player purchased four instant-type lottery tickets 74 as depicted in FIG. 4B. In addition, the lottery player purchased a "2×" multiplier (3C5) on a multiplier ticket 76. The purchase price of each instant-type lottery ticket is fixed by the lottery game provider that sponsors the lottery game. For example, the price of each lottery ticket may be one dollar. The purchase price of the "2×" multiplier (3C5) in this example is determined to be "$1.20" (3C9). The transaction resulted in the lottery player receiving the lottery tickets 74, 76 resembling those illustrated in FIG. 4B and the creation of record 3R3 in registration database 52.

In record 3R3, batch identifier "345" (3C4) associates instant-type lottery tickets "INST-1111", "INST-2222", "INST-3333", and "INST-4444" (3C6) (having VIRNs "1001", "2002", "3003", and "4004" (3C7), respectively) with the "2×" multiplier (3C5). If any of the four instant-type lottery tickets are found to be winning lottery tickets, then the "2×" multiplier can be applied to the redemption value of the winning lottery ticket. Although not required, the inclusion of the word "INSTANT" (3C2) in record 3R3 indicates that the lottery is an instant-type. The absence of any data in 3C2 (and/or 3C3) of record 3R3 could equally well have been used to indicate an instant-type lottery.

Another embodiment of the present invention provides lottery players of a drawing-type lottery game the opportunity to win a selected multiplier. In the embodiment, a lottery player selects one or more sets of play indicia, a multiplier-set of play indicia, and a multiplier, which are batched with one another.

If any of the one or more sets of player-selected play indicia is drawn but the multiplier-set of play indicia is not drawn, the lottery player receives the redemption value of the winning sets of play indicia. If any of the one or more sets of play indicia is drawn and the multiplier-set of play indicia is drawn, the lottery player receives the redemption value for the winning sets of play indicia and may apply the selected multiplier to the redemption value of one (or more, depending on the embodiment) of the one or more sets of play indicia. If none of the one or more sets of play indicia are drawn but the multiplier-set of play indicia is drawn, the lottery player will be unable to apply the selected multiplier in one embodiment of the present invention. In alternative embodiments, the multiplier can be used with other lottery tickets.

A fourth set of example data of an embodiment of the present invention is illustrated by record 3R4, where, on Dec. 31, 1998 (3C1), a lottery player purchased two sets of play indicia, "6-5-4-3-2-1" (3C8(A)) and "15-14-13-12-11-10" (3C8(B)), a "3×" multiplier (3C5) and a multiplier-set of play indicia, "5-4-3" (3C8(C1)) for drawings to be held on Jan. 4, 1999 (3C2). The drawing for the play indicia (3C8(A), 3C8(B)) is identified by the system as "1499A" (3C3(A)) and the drawing for the multiplier-set of play indicia (3C8(C1)) is identified by the system as "1499B" (3C3(B)). The lottery player selected that the multiplier-set of play indicia (if drawn) would win for the player a "2×" multiplier (3C8(C2)). The transaction resulted in the lottery player receiving the lottery ticket 78 illustrated in FIG. 4C and the creation of record 3R4 in registration database 52.

In record 3R4, batch identifier "234" (3C4) associates the sets of play indicia "6-5-4-3-2-1" (3C8(A)) and "15-14-13-12-11-10" (3C8(B)), the multiplier-set of play indicia "5-4-3" (3C8(C1)) with its corresponding "2×" multiplier (3C8(C2)), and their ticket identifier "DRAW-7654" (3C6) with the player-selected and purchased "3×" multiplier (3C5). The price of each set of play indicia is, for example, fixed at one dollar per set of lottery numbers, and the combined price of both the "3×" multiplier and the multiplier-set of play indicia is calculated in this example to be "$0.60" (3C9). Note that the present invention allows the lottery provider the flexibility to charge less for a multiplier-set of play indicia than for a multiplier because the player may not actually win the multiplier as a result of his purchase of the multiplier-set of play indicia. It should be understood that the lottery provider can use the expected value formulas discussed above to determine a price for the multiplier-set of play indicia.

In a variation of the embodiment described above with respect to record 3R4, the player-selected multiplier may be applied to any winning drawing-type lottery ticket. Likewise, in further alternative embodiments, the player-selected multiplier purchased for an instant or other type of lottery may be applied to any winning ticket.

Another embodiment of the present invention provides lottery players of an instant-type lottery game the opportunity to win either a cash value and/or a multiplier. In this embodiment, a lottery player may purchase one or more instant-type lottery tickets and have them associated in a batch with one another. The play indicia displayed on the tickets for winning a multiplier and that for winning a cash value can be indistinguishable from each other so that the player cannot tell initially whether he might win cash or a multiplier. If any of the instant-type lottery tickets wins a cash redemption value and any of the remaining instant-type lottery tickets wins a multiplier redemption value, then the cash redemption value can be multiplied by the multiplier to increase the winnings for the lottery player. An instant-type lottery ticket of this type may include a scratch-off portion under which three matching multiplier symbols constitute a winning ticket. The cost of each lottery ticket may be, for example, fixed at one dollar per ticket. As mentioned above, such a game could be played without the player knowing beforehand whether he will win a multiplier or a cash value if his tickets include a winning set of play indicia. The lottery provider can further specify rules that render a batch of play indicia that includes a won multiplier (but no cash value) as having no redemption value.

Alternatively, the lottery provider could specify that a won multiplier can be redeemed for a cash prize, additional play indicia/lottery tickets, and/or allow the player to apply the won multiplier to subsequently purchased winning set of play indicia or batch of sets of play indicia.

A calculation for the purchase price of an instant-type lottery ticket of this type may be based on many variables including the number of tickets printed, game configuration, sizes of payouts, number of multipliers, and the type of multipliers. Various specific purchase-price formulas may be derived for each different lottery game offered by lottery game providers based upon the principles and other factors described above.

In an alternative embodiment, a multiplier ticket can be applied to any winning lottery ticket, regardless, and independent, of any associations or batches of tickets. In yet another embodiment, a multiplier can be divided among the winning tickets in a batch or among the winning tickets purchased (or won) by the same person. In other words, a "6×" multiplier purchased along with a batch of ten tickets which happen to include three winning tickets can be applied several different ways depending on how the lottery game provider chooses to implement the game. In the embodiments discussed above, the "6×" multiplier could be applied to one, all, or some of the winning tickets. In this embodiment, the "6×" multiplier can be divided into three "2×" multipliers ("6/3×" multipliers) and each applied to one of the three winning tickets.

Alternatively the "6×" multiplier can be divided (or multiplied) in any manner specified by the lottery game provider and likewise applied to the winning tickets in any manner specified. For example, the "6×" multiplier could become an "18×" (a number determined based on multiplying the number of winning tickets in the batch (three) and the original multiplier (6×)). The "18×" multiplier could then be divided into three multipliers based upon the relative sizes of the redemption values of the winning tickets. For example, assume the winning tickets had redemption values of $10, $50, and $200, the multipliers for the $10, $50, and $200 tickets respectively would be calculated as follows:

Multiplier for the $10 ticket=18(10/(10+50+200))
=0.69×

Multiplier for the $50 ticket=18(50/(10+50+200))
=3.46×

Multiplier for the $200 ticket=18(200/(10+50+200))
=13.85×

Applying these multipliers to their respective winning tickets results in the player winning a total payout of $2,949.90= (0.69)(10)+(3.46)(50)+(13.85)(200). This example further illustrates that multipliers can be used by the lottery provider to offer lottery players many different alternative prize structures. Note that in this example, the $10 ticket was actually devalued by application of the multiplier. Also note though, that in this example, (A) the total payout was increased by $1689.90 over the straight multiplication of six times the largest winning ticket value plus the other two tickets' value which would have only paid $1260.00 and (B) the total payout was increased by $1389.90 over the straight multiplication of six times all three cash redemption values which would have only paid $1560.00.

Referring now to record 3R5, additional example data is described. On Dec. 30, 1998 (3C1), a lottery player purchased three instant-type lottery tickets 80 of the type providing the opportunity for the lottery player to win a multiplier and/or a monetary value. The transaction resulted in the lottery player receiving the lottery tickets 80, 82 illustrated in FIG. 4D and the creation of record 3R5 in registration database 52.

In record 3R5, batch identifier "123" (3C4) associates the three ticket identifiers "INST-5555", "INST-6666", and "INST-7777" (3C6) and their respective VIRNs "5005", "6006", and "7007" (3C7). If any of the instant-type lottery tickets are winning tickets and any of the tickets happen to include one or more multipliers (either won or purchased), then the redemption value of one or more of the winning tickets can be multiplied by the one or more multipliers to increase the winnings for the lottery player. The lottery provider can establish rules as to whether a player can apply the one or more multipliers to different winning tickets. In addition, the lottery provider can allow players to add additional lottery tickets to a batch of previously associated tickets. For example, in the case of a drawing-type lottery, a player can be permitted to add any number of tickets to a previously purchased batch for an additional fee up until the drawing.

A variation of the embodiment described above with respect to record 3R5 includes applying a multiplier that was won while playing an instant-type lottery game, to any winning instant-type, drawing-type, or other lottery ticket.

A variation of the embodiments described above with respect to records 3R4 and 3R5 includes batching sets of play indicia and identifying the batch with an identifier that is unique to the lottery player purchasing the batch. Any identifier unique to the lottery player can be used, for example, the lottery player's social security number, credit card number, a personal identification number ("PIN"), or other identifier assigned by a lottery retailer. Thereafter, the lottery player can purchase additional lottery tickets at any time. These tickets can also be associated with the lottery player's unique identifier. The number of tickets that the player can purchase and automatically associate with one or more multipliers can be limited or the time period in which such tickets can be purchased and added to the batch can be limited. Alternatively, players can be allowed to purchase a "multiplier subscription" where for example, a periodic fee can be paid to allow a multiplier to be available to be applied to all winning tickets purchased during a given time period.

An advantage of the above variation is that lottery players may apply any multiplier that they win to any winning lottery ticket that they purchase. This provides lottery players an incentive to purchase a large number of lottery tickets during the life of the lottery game with the hope of winning multipliers that may be applied to winning lottery tickets.

In another embodiment of the present invention, multipliers can be purchased (or won) by a group or an individual member or subset of members of a group. The group of lottery players can become associated with each other such that if the group, a group member, or a subset of group members holds a winning lottery ticket the group, a group member, or a subset of group members that purchased or won the multiplier can apply the multiplier to the winning ticket. In a similar alternative embodiment, holders of winning lottery tickets can be permitted to join with holders of multiplier tickets based upon predefined rules specified by the lottery provider. For example, a lottery player holding a winning lottery ticket with a distinct visual pattern can be permitted to apply the multiplier of a lottery player holding a multiplier ticket with a matching graphical pattern assuming the two players are able to locate each other within a predetermined amount of time. Instead of matching graphical patterns, multi-digit numbers or other indicia could also be used.

Another set of example data illustrating an embodiment of the present invention is provided in record 3R6, where on Dec. 29, 1998 (3C1), a lottery player purchased a set of drawing-type lottery numbers, "1-2-4-5-8-10" (3C8), and a "1.5×" multiplier (3C5) from a lottery retailer for a drawing identified by the system as "1399A" (3C4) on Jan. 3, 1999 (3C2). The cost of the set of lottery numbers is fixed at, for example, one dollar. The example price of the "1.5×" multiplier (3C5) was determined to be "$0.30" (3C9). The above transaction resulted in the creation of record 3R6 in registration database 52.

In record 3R6, batch identifier "012" (3C4) associates the set of lottery numbers "1-2-4-5-8-10" (3C8) and a ticket identifier "DRAW-8888" (3C6) with the "1.5×" multiplier (3C5). If the lottery ticket is a winning ticket according to the Jan. 3, 1999 (3C2) drawing, then the "1.5×" multiplier (3C5) will be applied to the redemption value of the winning set of lottery numbers.

F. THE WINNING NUMBERS DATABASE

Referring to FIG. 5, a sample table illustrates the contents of an example embodiment of a winning numbers database 54. In one embodiment of the present invention, the winning numbers database 54 includes a record (5R1 through 5R5) for each set of lottery numbers drawn for drawing-type lottery games. Typically, the lottery numbers are randomly drawn from a predetermined set of numbers by a lottery game provider on designated dates. Many methods for randomly drawing numbers from a predetermined set of numbers are well known to those skilled in the art.

In this embodiment, each record includes a field for a drawing date (5C1), drawing identifier (5C2), winning numbers, i.e., numbers drawn on the drawing date (5C3), and a cash redemption value (5C4) of a winning lottery ticket. This example provides four cash redemption value levels (5C4(A) through 5C4 (D)) which indicate the payout when a lottery player's set of lottery numbers (play indicia) includes six 5C4(A), five 5C4(B), four 5C4(C), or three 5C4(D) of the six numbers drawn (6/6, 5/6, 4/6, or 3/6, respectively).

It should be understood that the values shown in the winning numbers database 54 are for illustration only. Those skilled in the art will appreciate that the cash redemption value for each payout level will depend on various factors including those described above. For example, such factors can include the expected value of a particular set of play indicia or lottery entries. Those skilled in the art will also appreciate that winning numbers database 54 may be uploaded to or accessed by each or any of the lottery terminals 14(1) through 14(N) and player terminals 16(1) through 16(N) to enable lottery players, providers, and retailers to easily identify winning lottery tickets/play indicia and to relate the winning numbers database 54 to the other databases of the system of the present invention.

Referring now to both FIGS. 3 and 5, examples of the use of the winning numbers database 54 are provided. It should be understood that the winning numbers database 54 relates to the registration database 52 in that the drawing date (5C1) and drawing identifier (5C2) elements of the records of the winning numbers database 54 of FIG. 5 represent the same information as the drawing date (3C2) and drawing identifier (3C3) elements of the records of the registration database 52 of FIG. 3. The example provided allows for multiple drawings on the same date to be uniquely identified through the use of a drawing identifier (3C3). However, if there were only one drawing per day, the drawing date (3C2) could also serve as an identifier and the use of the drawing identifier (3C3) could be eliminated. It should further be understood that although FIGS. 3 and 5 represent a particular data structure and imply a particular relationship between the winning numbers database 54 and the registration database 52, any number of alternative data structures and table relationships could be used. In this example, the records in the winning numbers database 54 have a "one-to-many" relationship with the records in the registration database 52. In other words, for each drawing identified in the winning numbers database 54, there will likely be many purchased tickets for the identified drawing listed in the registration database 52.

As described above with respect to record 3R1, on Jan. 3, 1999, a lottery player selected and purchased two sets of play indicia (3C8) and a "2×" multiplier (3C5). The sets of play indicia and multiplier were batched and are identified by batch identifier "567" (3C4). Referring to record 5R1 in the winning numbers database 54 of FIG. 5, on Jan. 6, 1999 (5C1), in the drawing identified as "1699A" (5C2) play indicia "1-2-7-8-9-10" (5C3) were drawn by a lottery game provider. A comparison of element 3C8 of record 3R1 of the registration database 52 of FIG. 3 with element 5C3 of record 5R1 of the winning numbers database 54 of FIG. 5 reveals that five of the six (5/6) play indicia, i.e., "1", "2", "7", "8", and "9", of one of the sets of play indicia selected by the lottery player matched the drawn play indicia. Therefore, as indicated by the cash redemption value element (5C4) of the winning numbers database 54, the lottery player's set of play indicia had a cash redemption value of $20,000 (5C4(B)) because five of six play indicia matched the drawn winning play indicia (5C3). Furthermore, because the lottery player's set of play indicia are batched with a "2×" multiplier (3C5), the total amount to be awarded the lottery player in this example is equal to $40,000 (2×$20,000).

As described above with respect to record 3R2, on Jan. 2, 1999 (3C1), a lottery player selected and purchased five sets of lottery numbers (3C8) and a "4×" multiplier (3C5). The sets of lottery numbers and the multiplier were batched and identified by batch identifier "456" (3C4). On Jan. 5, 1999 (3C2; and 5C1 of 5R2), lottery numbers "20-22-25-30-32-34" (5C3 of 5R2) were drawn by a lottery game provider. The drawing is identified by drawing identifier "1599A" (5C2 and 3C3). Three of the six (3/6) lottery numbers, i.e., "20", "22", and "25", of one of the sets of lottery numbers selected by the lottery player matched the drawn set of lottery numbers, therefore, the lottery player's set of lottery numbers had a cash redemption value of $20 (5C4(D)). Furthermore, because the lottery player's winning set of lottery numbers are batched with the "4×" multiplier (3C5), the total amount won by the lottery player is $80 (4×$20).

As described above with respect to record 3R4, on Dec. 31, 1998 (3C1), a lottery player selected and purchased two sets of play indicia. The player also selected and purchased a third set of play indicia (a multiplier set of play indicia) (3C8(C1)) for the chance to win a "2×" multiplier (3C8(C2)). The player chose a "2×" multiplier (3C8(C2)) as the multiplier he would receive if the multiplier set of play indicia was a winning set. The player also selected and purchased a "3×" multiplier (3C5) that can be applied to the redemption value of any winning set of play indicia. The sets of play indicia and multipliers were batched and identified by batch identifier "234" (3C4). On Jan. 4, 1999 (3C2; and 5C1 of 5R3 and 5R4), lottery numbers "9-8-7-6-5-4" (5C3 of 5R3) and multiplier lottery numbers "5-4-3" (5C3 of 5R4) were drawn by a lottery game provider. The drawings are identified by drawing identifiers "1499A" (5C2 of 5R3) and "1499B" (5C2 of 5R4), respectively. Three of the six (3/6) play indicia, i.e., "6", "5", and "4", of one of the sets of play indicia selected by the lottery player matched the drawn set of lottery numbers. Therefore, the lottery player's set of play indicia had a redemption value of $20 (5C4(D) of 5R3). In addition, the lottery player's selected multiplier-set of play indicia, i.e., "5-4-3", matched the drawn multiplier lottery numbers, therefore, the lottery player won the selected multiplier, i.e., "2×". Furthermore, the lottery player had purchased a "3×" multiplier and because lottery player's winning sets of play indicia were batched together, the total amount won by the lottery player is $120 (2×$20×3).

As described above with respect to record 3R6, on Dec. 29, 1998 (3C1), a lottery player selected and purchased the set of lottery numbers "1-2-4-5-8-10" (3C8) and a "1.5×" multiplier (3C5). The set of lottery numbers and multiplier were batched and identified by batch identifier "012" (3C4). On Jan. 3, 1999 (3C2; and 5C1 of 5R5), lottery numbers "1-3-5-7-9-11" (5C3 of 5R5) were drawn by a lottery game provider. The drawing is identified by drawing identifier "1399A" (5C2). Considering the lottery player who purchased the ticket identified as "DRAW-8888" (3C6 of 3R6), since only two of the six (2/6) lottery numbers, i.e., 1 and 5, selected by the lottery player match the set of lottery numbers drawn by the lottery game provider, the lottery player was not entitled to receive a payout for the set of lottery numbers he selected.

G. THE WINNING TICKETS DATABASE

Referring to FIG. 6, a sample table illustrates the contents and structure of an example of a winning tickets database 56. The winning tickets database 56 includes a record (for example, 6R1 through 6R9) for each lottery ticket having a redemption value (for example, a cash amount and/or a won multiplier). Each record can include fields for the ticket identifier (6C1), batch identifier (6C2), VIRN (6C3), drawing identifier (6C4), redemption value (6C5), and the redemption status (6C6) of winning tickets. The winning tickets database 56 is used to store the values and status of all winning lottery tickets. The redemption values (6C5) listed in the winning tickets database 56 may also benefit from the application of a purchased multiplier if the ticket (6C1) is batched with a purchased multiplier as indicated in the registration database 52 of FIG. 3.

Referring to FIGS. 3 through 6, examples of the use of the winning tickets database 56 are provided below. As described above with respect to record 3R1, a lottery player purchased drawing-type lottery tickets "DRAW-2345" and "DRAW-2346" (3C6). The sets of lottery numbers were associated with each other and a "2×" multiplier (3C5) by batch identifier "567" (3C4). As also described above with respect to FIGS. 3 and 5, the set of lottery numbers printed on lottery ticket "DRAW-2346" matched five of six (5/6) of the set of winning numbers. Therefore, lottery ticket "DRAW-2346" has a redemption value of $20,000. Referring now to FIG. 6, information relating to the winning lottery ticket is recorded in record 6R1 of the winning tickets database 56. The ticket identifier is "DRAW-2346" (6C1), the batch identifier is "567" (6C2), the VIRN field (6C3) is left blank for this drawing-type ticket, the drawing identifier is "1699A" (6C4), the redemption value is $20,000 (6C5), and the redemption status is "REDEEMED" (6C6). Note that the redemption value field (6C5) contains a cash value in this example because with the "DRAW-2346" ticket, the lottery player has won $20,000 as opposed to a multiplier. See the example depicted in record 6R7 described below for an example of a winning ticket with a redemption value of a won multiplier.

Because the lottery player's winning set of lottery numbers is associated with a "2×" multiplier (3C5 of 3R1) the lottery player received $40,000 (2×$20,000). As indicated in the redemption status field (6C6) of record 6R1 in the example winning tickets database 56 illustrated in FIG. 6, drawing-type lottery ticket "DRAW-2346" has been redeemed.

It is enlightening to compare the payout received for drawing-type lottery ticket "DRAW-2346" (6R1) and the payout received for drawing-type lottery ticket "DRAW-6432" (6R2). A multiplier was not purchased for "DRAW-6432". This is evidenced by the lack of a batch identifier (6C2 of 6R2) associated with ticket identifier "DRAW-6432". Therefore, even though both lottery tickets, "DRAW-2346" and "DRAW-6432" had the same redemption value, i.e., both lottery tickets included a set of lottery numbers that matched five of the six (5/6) of the set of winning numbers (5C3 of 5R1) for the same drawing "1699A" (6C4 of 6R1), the "DRAW-2346" ticket is ultimately worth twice that of the "DRAW-6432" ticket, i.e., $40,000 as compared to $20,000. This comparison highlights an alluring aspect of the present invention to lottery players: for the relatively small cost of a multiplier, the players can dramatically increase the value of their potential winnings.

As described above with respect to record 3R2 of FIG. 3, a lottery player purchased five sets of lottery numbers on a drawing-type lottery ticket having ticket identifier "DRAW-1234" (3C6). The sets of lottery numbers were associated with each other and to a "4×" multiplier (3C5) by batch identifier "456" (3C4). The lottery tickets are illustrated in FIG. 4A.

As described above with respect to FIGS. 3 and 5, a set of lottery numbers printed on lottery ticket "DRAW-1234" matched three of six (3/6) of the set of winning numbers. Therefore, lottery ticket "DRAW-1234" has a redemption value of $20. Information relating to the winning lottery ticket is recorded in record 6R3 of the winning tickets database 56.

Because the lottery player's winning set of lottery numbers is associated with a "4×" multiplier, the lottery player is to receive $80 (4×$20). As indicated in the redemption status field (6C6 of 6R3), drawing-type lottery ticket DRAW-1234 has not yet been redeemed.

As described with respect to record 3R3, a lottery player purchased instant-type lottery tickets "INST-1111", "INST-2222", "INST-3333", and "INST-4444" (3C6). The instant-type lottery tickets are associated with each other and to a "2×" multiplier (3C5) by batch identifier "345" (3C4). The lottery tickets are illustrated in FIG. 4B. After the lottery player removes the latex coating from each instant-type lottery ticket, it is revealed that lottery tickets "INST-1111" and "INST-2222" have redemption values of $5 and $10, respectively. Information relating to the winning lottery tickets is recorded in record 6R4 and record 6R5, respectively, of the winning tickets database 56.

Because both of the lottery player's instant-type lottery tickets "INST-1111" and "INST-2222" are associated in record 3R3 of the registration database 52 with a "2×" multiplier (3C5), the lottery player can decide which lottery ticket he desires to apply the "2×" multiplier. Obviously, the lottery player will choose to apply the multiplier to lottery ticket "INST-2222" since it has the higher redemption value of $10. Therefore, the lottery player receives a total payout of $25 ($5+(2×$10)). As indicated in their respective redemption status fields (6C6), both instant-type lottery tickets have been redeemed.

In an alternate embodiment, the holder of a multiplier ticket can apply the multiplier to any number of winning lottery tickets within the associated batch of tickets. In such an embodiment, the number of winning lottery tickets, or winning play indicia, to which the multiplier can be applied can be as large as the number of tickets (or sets of play indicia) in the batch. Note that the batch can include sets of play indicia purchased or won at different times. Alternatively, the multiplier could be sold or awarded under the condition that it will be applied to only a limited number or a specific subset of winning tickets within a batch.

Likewise, in yet another embodiment, the holder of a multiplier ticket can apply the multiplier to any number of winning lottery tickets (or winning play indicia) independent of any associations or ticket batches. In this embodiment, the only restriction might be that the multipliers and play indicia were simultaneously owned by the same person or were purchased at the same location or through the same retailer. Alternatively, the only restriction might be that the number of winning lottery tickets, or winning play indicia, to which the multiplier will be permitted to be applied is limited to a number called an "applications count." An applications count refers to a number of winning play indicia sets to which the multiplier can be applied. The applications count can be purchased separately, or won separately as an additional prize. In a non-batched embodiment, the applications count can be determined based upon the amount a player is willing to pay or the lottery provider wishes to permit.

In another embodiment, players are permitted to purchase a plurality of multipliers for the same batch of tickets. If the batch includes two or more winning tickets, the multipliers can be applied to the winning tickets in any number of different ways. For example, the lottery game provider can specify particular multiplier application and payout rules, e.g. the smallest multiplier is applied to the largest payout. This allows the lottery provider maximum control over the size of the payouts. Alternatively, it could be left to the player to determine how to apply the multipliers so as to allow the player to maximize the total payout.

Figure 4C:
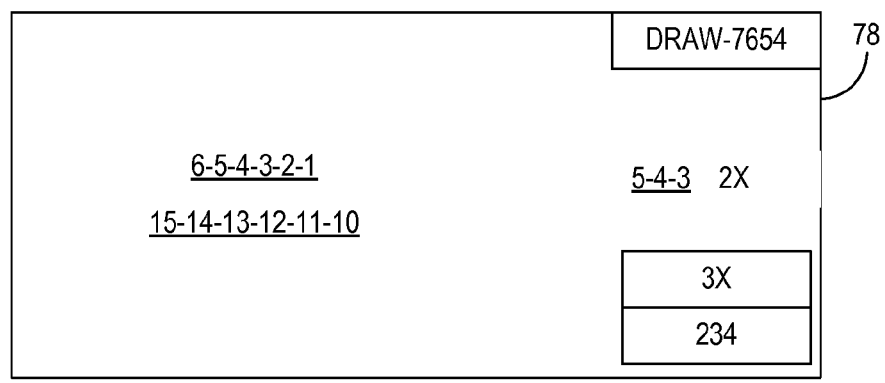
FIG. 4C is an example depiction of lottery tickets that could be used with some of the embodiments of the present invention.

As described above with respect to record 3R4 of FIG. 3, a hypothetical lottery player purchased two sets of play indicia, a "3×" multiplier, and a three-number multiplier-set of play indicia for a drawing-type lottery ticket identified as "DRAW-7654" (3C6). The sets of play indicia (lottery numbers) and the "3×" multiplier were associated with each other by batch identifier "234" (3C4). The lottery ticket 78 is illustrated in FIG. 4C.

As also described above with respect to record 3R4 of FIG. 3, FIG. 4C, records 5R3 and 5R4 of FIG. 5, and records 6R6 and 6R7 of FIG. 6, a set of the play indicia ("6-5-4-3-2-1" (3C8(A)) printed on the lottery ticket 78 identified as "DRAW-7654" (3C6) matched three of six or "3/6" (5C4(D))) of the set of winning numbers (5C3) for drawing identified as "1499A" (5C2). Therefore, lottery ticket "DRAW-7654" has a redemption value of $20. Information relating to the winning lottery ticket is recorded in record 6R6 of the winning tickets database 56.

In addition, the three-number multiplier-set of play indicia ("3-4-5") on lottery ticket "DRAW-7654" 78 matched the set of winning play indicia (5C3 of 5R4) for drawing "1499B". Therefore, lottery ticket "DRAW-7654" also has a won multiplier of "2×". Information relating to the winning multiplier lottery ticket is recorded in record 6R7 of the winning tickets database 56.

Applying both the purchased multiplier (3C5 of 3R4) and the won multiplier (6C5 of 6R8) to the redemption value, the payout for the lottery ticket is determined to be $120 (2×3×$20). As indicated in the redemption status field (6C6), drawing-type lottery ticket DRAW-7654 has been redeemed.

Figure 4D:
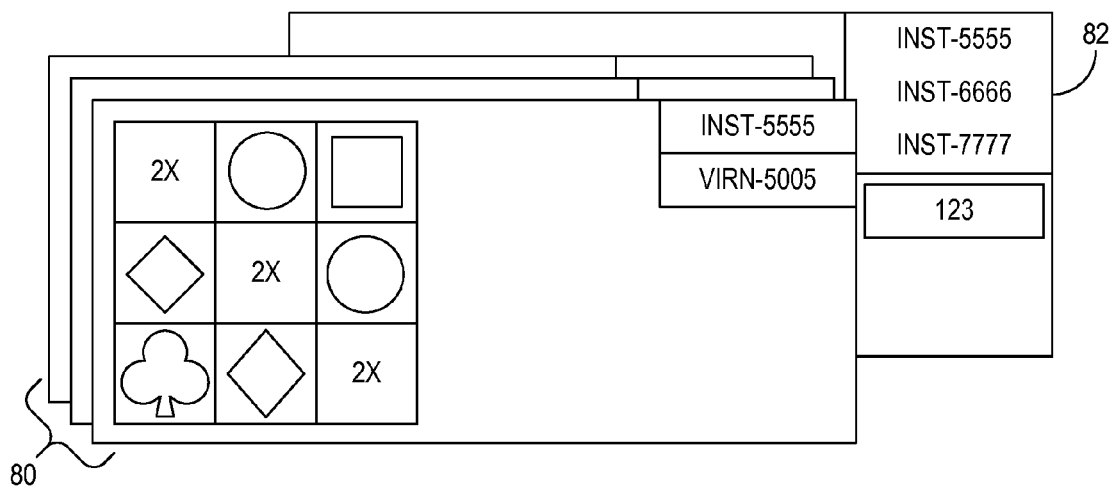
FIG. 4D is an example depiction of lottery tickets that could be used with some of the embodiments of the present invention.

As described above with respect to record 3R5, a lottery player purchased instant-type lottery tickets "INST-5555", "INST-6666", and "INST-7777" (3C6). The instant-type lottery tickets are associated with each other by batch identifier "123" (3C4). Examples of the lottery tickets 80 are illustrated in FIG. 4D. The lottery tickets are multiplier-type instant lottery tickets, wherein the lottery player may win a multiplier by revealing a particular set of play indicia that satisfy the rules of a particular instant-type lottery game.

After removing the latex coating from each instant-type lottery ticket, "INST-5555" reveals a multiplier of "2×" and "INST-7777" reveals a redemption value of $30. Information relating to the multiplier and cash winning instant-type lottery tickets are recorded in record 6R8 and in record 6R9 respectively of the example winning tickets database 56 show in FIG. 6.

Because both of the instant-type lottery tickets are associated with each other by batch identifier "123", the lottery player may apply the "2×" multiplier of lottery ticket "INST-5555" against the redemption value of lottery ticket "INST-7777". Therefore, the lottery player will receive a total of $60 (2×$30). As indicated in their respective redemption status fields (6C6), neither instant-type lottery ticket has yet been redeemed.

H. THE METHODS OF SELLING MULTIPLIERS

Figure 7:
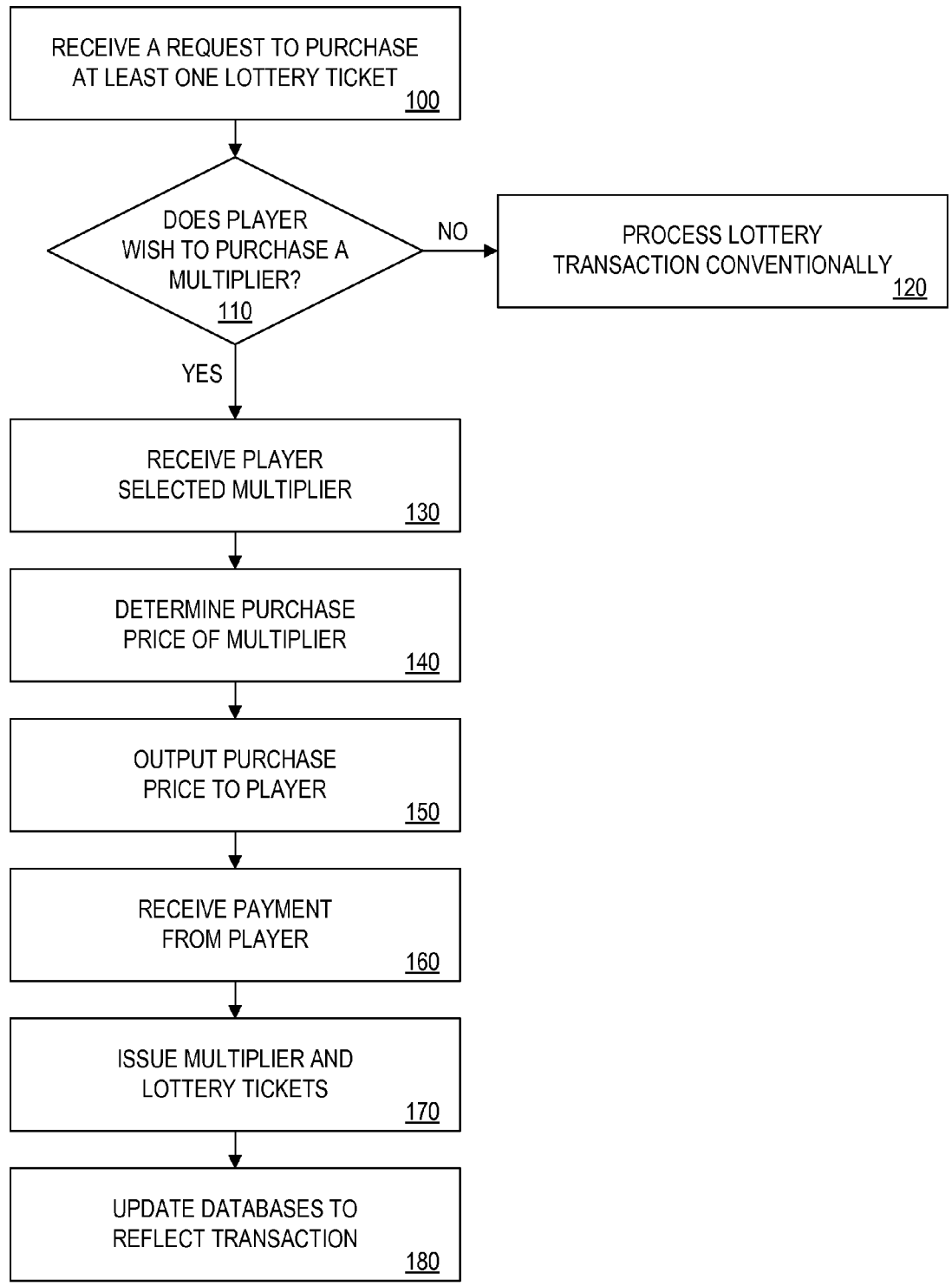
FIG. 7 illustrates a flow diagram of an example method for selling one or more drawing-type lottery tickets or instant-type lottery tickets in accordance with an embodiment of the present invention.

Referring to FIG. 7, a flow diagram illustrates example embodiments of a method for selling one or more drawing-type or instant-type lottery tickets having one or more sets of play indicia printed thereon. The flow diagram further illustrates associating a player-selected multiplier with the one or more sets of play indicia. The lottery tickets can be of the type wherein a lottery player may purchase or win a multiplier.

At Step 100, a lottery ticket retailer (e.g. lottery terminal 14(1) of FIG. 1) receives a request to purchase at least one lottery ticket having at least one set of play indicia printed thereon. If the lottery player desires to purchase a drawing-type lottery ticket, he may select at least one set of lottery numbers in Step 100. The format, quantity and ordinal value range of the numbers that are selected by the lottery player are dependent on the type of lottery game. For example, in a "6/49" game, six numbers are selected, each in the range from one to forty-nine. The lottery player may select the numbers individually by completing a machine readable form which the lottery retailer inputs into a lottery terminal, for example, lottery terminal 14(1). Alternatively, the lottery retailer may offer the lottery player a "Quick-Pick™" option, wherein a random-number generator or other method is used to select the numbers for the player and thus, the step of having to enter the player's numbers (play indicia) into the lottery terminal 14(1) is eliminated.

If the lottery player desires to purchase one or more instant-type lottery tickets, the lottery player selects the game type that he would like to play. The lottery retailer detaches the one or more instant-type lottery tickets from a roll or stack of instant-type lottery tickets for that particular game. Those skilled in the art will appreciate that a roll or stack of instant-type lottery tickets is a serialized group of instant-type lottery tickets that are typically printed on a continuous sheet of paper or light cardboard and separated by perforations.

At Step 110, the lottery player is queried as to whether he desires to purchase one or more multipliers to associate with the one or more sets of play indicia. The system of the present invention is operative to present a prompt to the cashier or other employee of the lottery retailer to make an offer to, or suggest to the lottery player that a multiplier can be purchased. This "upsell prompt" can take the form of a verbal, printed, or electronically displayed message to the lottery retailer employee. In addition, the offer to sell a multiplier can be presented directly to the lottery player via a display or printer coupled to the lottery terminal 14(1) or player terminal 16(1). The multiplier offer can also be in the form of a audio and/or visual message from the terminal or a spoken message from the lottery terminal operator or retailer. A printed message on the lottery tickets themselves can also be used to offer the multiplier.

If the lottery player does not desire to purchase a multiplier, then, at Step 120, the one or more sets of play indicia are processed conventionally. If the lottery player desires to purchase one or more multipliers, then, at Step 130, the lottery player is prompted to select one or more particular multipliers that are to be associated with the one or more sets of play indicia. For example, the lottery player may select a "2", "2.5", "3×", or "4×" multiplier or specify his own particular multiplier. Of course, as described above, associating a multiplier to the one or more sets of play indicia will also associate the multiplier to the related lottery tickets.

To encourage lottery players to purchase multipliers, a prompt may be displayed on a monitor suggesting to purchase a multiplier. The prompt may also provide information relative to the purchase of multipliers. For example, the prompt may include the purchase price for different multipliers, payouts for winning sets of lottery numbers with and without a multiplier, and recent payouts received by lottery players that were increased by a multiplier. The prompt's information can be delivered to the lottery player directly via a display monitor, printout, or other means and/or via a verbal suggestion provided by, for example, a lottery ticket distributor's cashier.

It is noteworthy that in accordance with the present invention, the lottery providers have the option of allowing players to choose a multiplier from among particular ranges of multipliers for particular lottery games. For example, the lottery provider may decide to offer lottery players the choice of a multiplier in the range of "1.5×" to "6.2×" for a particular lottery game.

At Step 140, after the lottery player selects a multiplier, the lottery retailer, for example, enters the selection into the lottery terminal 14(1) and the purchase price of the multiplier is calculated. The purchase price of a selected multiplier can be generally based in part on the expected values of the multiplier and/or the batch of lottery tickets purchased by the lottery player as described above. This calculation can account for several variables, including, for example, the probability of winning a payout, the value of the payout, a sharing discount, and the number of multipliers sold to date (for a particular lottery drawing in the case of a drawing-type lottery).

An alternative embodiment of the present invention includes carrying out Step 140 immediately after Step 100. For example, the alternate embodiment includes calculating the purchase price of all multipliers available to the lottery player to choose from immediately after entering the selected set of lottery numbers into the lottery terminal 14(1). Thereafter, at Step 110, the lottery retailer determines whether the lottery player desires to purchase a multiplier. This approach is advantageous in that the lottery player can be shown in advance the purchase price of each multiplier he may purchase. To expedite the selection process, the multipliers and their purchase prices may be displayed on a monitor that is viewable by the lottery player and, furthermore, the multipliers may be directly selectable by the lottery player using a touch-activated display monitor.

At Step 150, the total purchase price (i.e., the price of one or more sets of play indicia plus the price of the multiplier) of the transaction has been calculated and is presented to the lottery player. At Step 160, the lottery retailer receives payment from the player of the purchase price. At Step 170, the lottery retailer provides the one or more sets of play indicia and the multiplier on one or more lottery tickets to the lottery player. At Step 180, the registration database 52 (FIG. 3) is updated to include the information from the transaction and to record the association of the one or more sets of play indicia and the multiplier. This step links all the appropriate ticket identifiers (3C6) to the appropriate multiplier via the batch identifier (3C4). This ensures that a single ticket from a batch can be redeemed by a player, and the system can determine if a multiplier was purchased (or won) based on the ticket identifier (3C6). In this way, tickets can be associated with a multiplier to facilitate the system adjusting the payout upon redemption.

The creation of sample database records detailed above in the discussion relative to FIG. 3 illustrate various embodiments of Step 180. It should be understood that in alternative embodiments, Step 180 can be performed before tickets are printed or provided to the lottery player as well as before the lottery player pays for the tickets.

I. EXAMPLES OF SELLING MULTIPLIERS

Referring to FIGS. 3 and 4, several examples of the method illustrated in FIG. 7 and described above are provided below.

Referring to record 3R2, a lottery player requests to purchase five sets of lottery numbers on a single lottery ticket in Step 100 of FIG. 7. The lottery retailer then determines whether the lottery player desires to purchase a multiplier in Step 110. If not, the retailer sells the player a standard lottery ticket in Step 120. Otherwise, the lottery player requests, in this example, that a "4×" multiplier is associated with each of the five sets of lottery numbers in Step 130. The lottery retailer enters the information into a lottery terminal, for example, lottery terminal 14(1), and a "4×" multiplier ticket to be associated with the five sets of lottery numbers is generated. The association, or batch, is identified with batch identifier "456" (3C4). In Step 140, the purchase price of the five sets of lottery numbers and the multiplier are determined. In Step 150, the price is displayed to the player and in Step 160, the lottery player pays the purchase price. Tickets are then issued to the lottery player in Step 170 by the retailer.

In this example, the lottery player receives a single drawing-type lottery ticket 70 and a multiplier ticket 72 as illustrated in FIG. 4A. The lottery ticket 70 includes the five sets of lottery numbers and their associated ticket identifier. The multiplier ticket 72 includes the ticket identifier, the multiplier, and the batch identifier. In Step 180, the registration database 52 (FIG. 3) is updated to include the information from the transaction and to record the association of the "4×" multiplier with the five sets of lottery numbers. In an alternative embodiment, the multiplier number and batch identifier are printed on the lottery ticket 70 and a multiplier ticket 72 is not generated or printed.

Referring to the next example in record 3R3, in Step 100 a lottery player requests to purchase four instant-type lottery tickets. The lottery retailer then determines whether the lottery player desires to purchase a multiplier in Step 110. In Step 130, the lottery player requests that a "2×" multiplier (3C5) is associated with each lottery ticket. The lottery retailer scans four instant-type lottery tickets into a lottery terminal, for example, lottery terminal 14(1), and a "2×" multiplier (3C5) is associated with four instant-type lottery tickets. The batch is identified with a batch identifier "345". The purchase price of the four instant-type lottery tickets and the multiplier are determined in Step 140, the price is conveyed to the player in Step 150 and the lottery player pays the purchase price in Step 160.

Thereafter in Step 170, the lottery player receives the four instant-type lottery tickets 74 and a multiplier ticket 76 as illustrated in FIG. 4B. The multiplier ticket 76 includes the ticket identifiers of the four instant-type lottery tickets, the multiplier, and the batch identifier. The registration database 52 (FIG. 3) is updated to include the information from the transaction in Step 180.

Referring to the next example in record 3R4, in Step 100 a lottery player requests to purchase two sets of play indicia on a single lottery ticket. The lottery retailer then determines whether the lottery player desires to purchase a multiplier and/or a chance to win a multiplier in Step 110. At such time in Step 130, the lottery player requests in this example to purchase both a "3x" multiplier and a multiplier-set of play indicia for a chance to win a "2x" multiplier. The lottery retailer enters the sets of lottery numbers into a lottery terminal, for example, lottery terminal 14(1), and thereby associates the multipliers and play indicia in a batch. The batch is identified with batch identifier "234". The purchase price of the ticket 78 which includes two sets of play indicia, the multiplier, and the multiplier-set of play indicia, is determined in Step 140, the price is output in Step 150 and the lottery player pays the purchase price in Step 160.

Thereafter in Step 170, the lottery player receives a single drawing-type lottery ticket 78 as illustrated in FIG. 4C. The registration database 52 (FIG. 3) is updated to include the information from the transaction in Step 180.

Referring to the next example in record 3R5, a lottery player requests to purchase three instant multiplier-type lottery tickets. In this embodiment, Steps 100 and 110 are skipped. In response to player's request, the lottery retailer scans in or otherwise enters the ticket identifiers of three instant multiplier-type lottery tickets into a lottery terminal, for example, lottery terminal 14(1), and the ticket identifiers of each lottery ticket are associated with batch identifier 123. In this embodiment, the price for these ticket are previously known, thus Steps 140 and 150 are also skipped. In exchange for payment (Step 160), the lottery player receives three instant multiplier-type lottery tickets 80 and a multiplier ticket 82 as illustrated in FIG. 4D at Step 170. The multiplier ticket 82 includes the ticket identifiers of the three instant multiplier-type lottery tickets and the batch identifier. In Step 180, the registration database 52 (FIG. 3) is updated to include the information from the transaction.

J. THE METHODS OF REDEEMING MULTIPLIERS

Figure 8:
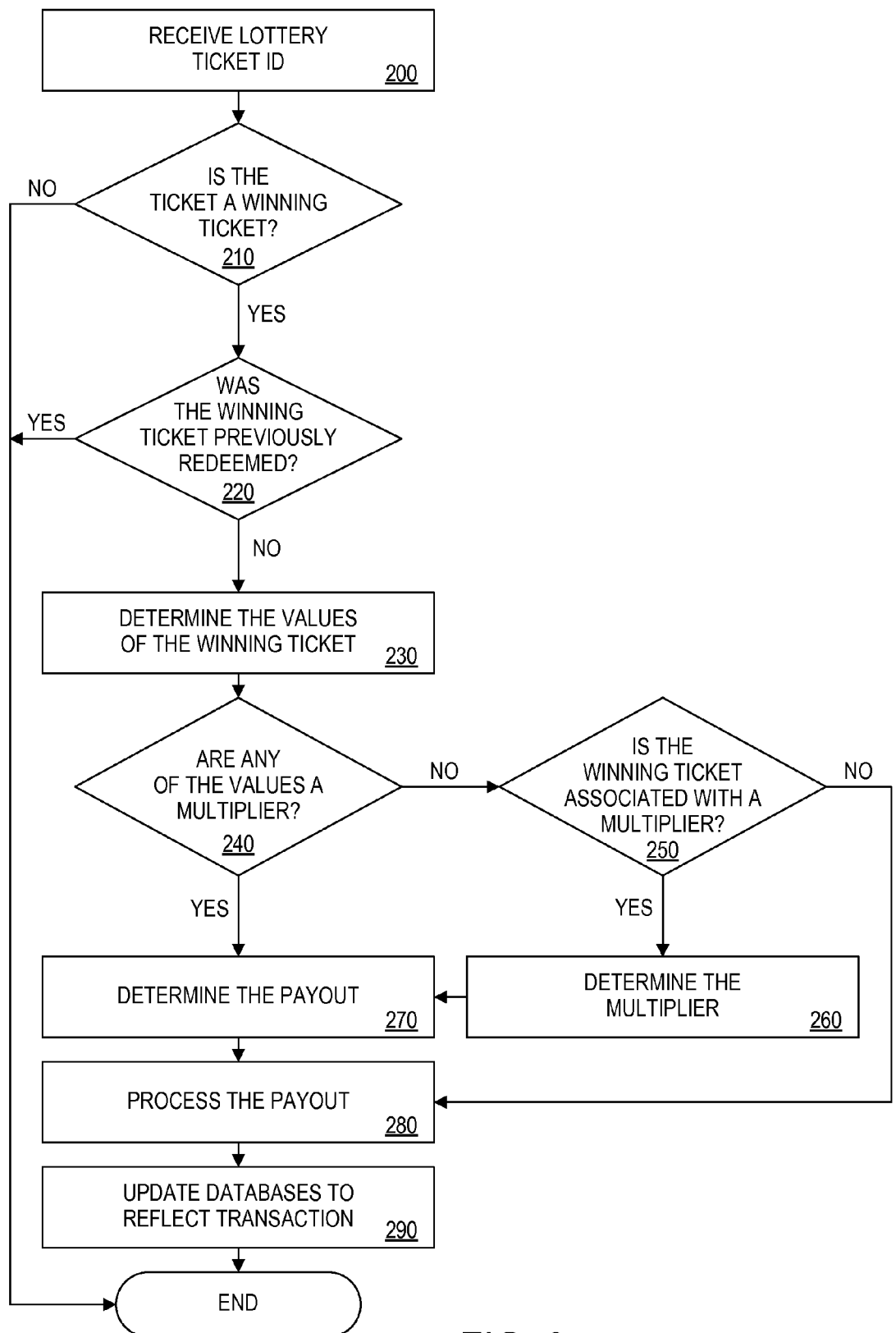
FIG. 8 illustrates a flow diagram of an example method for redeeming one or more drawing-type lottery tickets or instant-type lottery tickets in accordance with an embodiment of the present invention.

Now referring to FIG. 8, a flow diagram is described that illustrates example embodiments of a method for redeeming a drawing-type lottery ticket or an instant-type lottery ticket. The lottery tickets can be of the type wherein a lottery player may either purchase or win a multiplier.

At Step 200, a lottery ticket retailer receives a lottery ticket for redemption from a lottery player and enters the lottery ticket's identifying information into a lottery terminal, for example, lottery terminal 14(1). The information may be manually entered or, if included on the lottery ticket in e.g. a bar code format, scanned into the lottery terminal 14(1). As is well known in the art, it is often required for instant-type lottery tickets that a code, for example, a VIRN, printed beneath the removable scratch-off latex layer is also input into the lottery terminal 14(1). This is typically done to verify that the lottery ticket is valid.

At Step 210, the winning tickets database 56 (FIG. 6) is queried to determine whether the lottery ticket received at Step 200 is a winning lottery ticket. If it is determined that the lottery ticket is not a winning lottery ticket, for example, the ticket identifier is not found in the winning tickets database 56, then the lottery retailer is signaled that the ticket is a losing lottery ticket and the process ends. If instead it is determined that the lottery ticket is a winning lottery ticket, then the process proceeds to Step 220.

At Step 220, the redemption status field (6C6) of the winning tickets database 56 is retrieved to determine whether the winning lottery ticket was previously redeemed. If it is determined that the winning lottery ticket was previously redeemed, then the lottery retailer is notified as such and the routine ends. If instead it is determined that the winning lottery ticket was not previously redeemed, then the process proceeds to Step 230.

At Step 230, one or more redemption values (dollar amounts and/or multipliers) of the winning lottery ticket are determined by querying the redemption value field (6C5) of the record for the winning lottery ticket in the winning tickets database 56. The one or more dollar amounts and/or multiplier sizes of the winning lottery ticket are read and stored in the memory of the lottery terminal 14(1).

At Step 240, the one or more dollar amounts and/or multipliers of the winning lottery ticket are evaluated to determine if any of the data represent a multiplier. If any of this data does represent a multiplier, then the process advances to Step 270. It should be understood that when one or more of the dollar amounts and/or multipliers of the winning lottery ticket represent a multiplier, the lottery ticket is of the type where a multiplier may be won. If none of the redemption values (6C5) represent a multiplier, then the routine advances to Step 250.

At Step 250, the registration database 52 (FIG. 3) is queried to determine whether the winning lottery ticket is associated with a particular multiplier that was purchased with the winning lottery ticket. In an embodiment that uses the data structures described above, the query can be accomplished by searching the ticket identifier field (3C6) of each record in the registration database 52 to determine if there is a record containing the ticket identifier of the winning lottery ticket. If it is determined that the winning lottery ticket is not associated with a multiplier, then the process proceeds to Step 280 where the payout of the lottery ticket is processed. If it is determined that the winning lottery ticket is associated with a multiplier, then the routine proceeds to Step 260.

At Step 260, the registration database 52 is further queried to determine the multiplier that is associated to the winning lottery ticket. This is accomplished by reading the multiplier field (3C5) for the record found in Step 250. Thereafter, the multiplier that is associated with the ticket identifier is retrieved from the multiplier field (3C5) and stored in the memory of the lottery terminal 14(1).

At Step 270, the payout to the lottery player is determined based on a dollar amount of the redemption value and one or more multipliers. More specifically, at least one of the dollar amount redemption values determined at Step 230 are multiplied by a won multiplier determined in Step 230/240 and/or a purchased multiplier determined at Step 260, as the case may be. As indicated above and discussed in more detail below, throughout various embodiments of the present invention, any number of different methods of applying multipliers to redemption values can be employed by the lottery provider at this point in the process.

Although not explicitly illustrated and described with respect to FIG. 8, an embodiment of the present invention in which a player can both purchase and win a multiplier is contemplated wherein the product (sum or some other function) of the multipliers can be applied to a dollar amount won via another set of play indicia, associated or not, depending upon the lottery rules as defined by the lottery provider.

At Step 280, the payout is disbursed to the lottery player that presented the lottery ticket to the lottery retailer at Step 200. And at Step 290, the winning tickets database 56 is updated to reflect that the lottery ticket has been redeemed (6C6).

K. EXAMPLES OF REDEEMING MULTIPLIERS

Referring to FIGS. 3 through 6, examples of the method illustrated in FIG. 8 and described above are provided below.

Referring to FIG. 4A, a lottery ticket retailer receives drawing-type lottery ticket 70 from a lottery player (Step 200) and enters the lottery ticket's identifying information, i.e., "DRAW-1234", into the lottery terminal 14(1). The winning tickets database 56 is queried to determine whether drawing-type lottery ticket 70 is a winning lottery ticket (Step 210).

Record 6R3 of the winning tickets database 56 is found to include ticket identifier "DRAW-1234", therefore, the redemption status field (6C6) is read to determine whether the winning lottery ticket was previously redeemed (Step 220). Because the drawing-type lottery ticket 70 was not previously redeemed, the redemption value field (6C5) is queried (Step 230). Drawing-type lottery ticket 70 is found to have a redemption value of $20. This value is stored in the memory of the lottery terminal 14(1). The lottery ticket is also found to not have a "won" multiplier (Step 240).

The registration database 52 is queried to determine whether the winning lottery ticket is associated with a purchased multiplier (Step 250) and, if so, the particular multiplier purchased. Drawing-type lottery ticket 70 is determined to be associated with a "4×" multiplier (Step 260).

The payout for the winning lottery ticket may be determined to be $80 (4×$20) (Step 270), which is disbursed to the lottery player (Step 280). Thereafter in Step 290, the winning tickets database 56 is updated to reflect that the lottery ticket has been redeemed (6C6).

An embodiment of the present invention includes a multiplier that may be applied only when the redemption value of a winning lottery ticket is within a predetermined range of values. For example, the "4×" multiplier of the above example may be designated to apply only to a winning lottery ticket having a redemption value of between $5 and $15. In such a case, the lottery player would not have been able to apply the "4×" multiplier to the $20 redemption value. This embodiment provides a lottery authority more control over the size of payouts and more control to remain profitable.

Another embodiment of the present invention includes a multiplier that may only be applied for a predetermined amount of time. For example, the "4×" multiplier of the above example may be designated to apply up until Feb. 5, 1999. In such a case, if the lottery player attempted to redeem drawing-type lottery ticket "DRAW-1234" after Feb. 5, 1999, he would not be able to apply the "4×" multiplier to the $20 redemption value.

Another embodiment of the present invention includes a multiplier that may only be applied to a winning lottery ticket if some predetermined external event occurs. For example, the "4×" multiplier of the above example may be designated to apply only if the New York Yankees® baseball team beats the Baltimore Orioles® on a particular date. As a further example, an embodiment may provide that the "4×" multiplier becomes a "5×" multiplier if both the Yankees® beat the Orioles® and the New York Mets® beat the Cincinnati Reds® on a particular date or during a baseball season.

Another embodiment of the present invention includes a multiplier that has a size that is not disclosed to the lottery player until it is applied to a winning ticket. For example, in the case of a multiplier that is won (as opposed to one that is purchased), a winning multiplier ticket may only display "Multiplier." The player will not know the actual multiplier amount until it is redeemed. Further, the multiplier amount may increase or decrease based on other conditions defined by the lottery provider as described above. Further examples of hidden size multipliers that change based on conditions include an unknown multiplier that may increase if it is redeemed at a specific location, redeemed with a certain type of instant ticket, or with a specific redemption value or redemption value range of ticket. This type of multiplier could also be defined to decrease the payout of a winning ticket. Hidden size multipliers can be purchased for drawing-type lotteries in addition to instant-type lotteries.

Another example of an embodiment of the redemption process illustrated in FIG. 8 is now discussed using the example tickets pictured in FIG. 4B. A lottery ticket retailer receives instant-type lottery tickets 74 from a lottery player and enters at least one of the lottery tickets' identifying information into the lottery terminal 14(1) (Step 200). The winning tickets database 56 is queried to determine whether any of the instant-type lottery tickets 74 are winning lottery tickets (Step 210).

Records 6R4 and 6R5 of the winning tickets database 56 are found to include ticket identifiers "INST-1111" and "INST-2222", respectively. The redemption status field (6C6) is read to determine whether the winning lottery tickets were previously redeemed (Step 220). Because the instant-type lottery tickets were previously redeemed, the lottery retailer is alerted not to provide any payout and the process ends. For the purpose of proceeding with the present example, it will be assumed that the lottery tickets were not previously redeemed. Therefore, the redemption value field (6C5) is queried (Step 230).

Instant-type lottery ticket "INST-1111" is found to have a redemption value of $5 and instant-type lottery ticket "INST-2222" is found to have a redemption value of $10. These redemption values are stored in the memory of the lottery terminal 14(1). The lottery tickets are also found not to have multipliers that were "won" (Step 240).

The registration database 52 (FIG. 3) is queried to determine whether the winning lottery tickets are associated with a purchased multiplier (Step 250). Instant-type lottery tickets "INST-1111" and "INST-2222" are determined to be associated with a "2×" multiplier (Step 260).

As discussed above, the present invention contemplates many options as to how it is determined which of the lottery tickets the multiplier is to be applied. Of course, in the embodiment where the lottery player is allowed to choose one ticket to apply the multiplier to, he will apply the multiplier to the more valuable lottery ticket. In this case, the payout for the winning lottery tickets is determined to be $25 ($5+(2×$10)) (Step 270), which is disbursed to the lottery player (Step 280). In another embodiment the multiplier can be applied to all of the winning tickets in the batch and the player receives $30 (2×($5+$10)). Thereafter, the winning tickets database 56 is updated to reflect that the lottery tickets have been redeemed (6C6) (Step 290).

Another example of an embodiment of the redemption process illustrated in FIG. 8 is now discussed using the example tickets pictured in FIG. 4C. A lottery ticket retailer receives drawing-type lottery ticket 78 from a lottery player and enters the lottery ticket's identifying information into the lottery terminal 14(1) (Step 200). The winning tickets database 56 is queried to determine whether drawing-type lottery ticket 78 is a winning lottery ticket (Step 210).

Records 6R6 and 6R7 of the winning tickets database 56 are found to include ticket identifier "DRAW-7654", therefore, the redemption status field (6C6) is read to determine whether the winning lottery ticket was previously redeemed (Step 220). Because the drawing-type lottery ticket 78 was previously redeemed, the lottery retailer is signaled not to make a payout and the process ends. For the purpose of proceeding with the present example, it will be assumed that the lottery tickets were not previously redeemed. Therefore, the redemption value field (6C5) is queried for each "DRAW-7654" record. (Step 230).

Drawing-type lottery ticket 78 is found have a redemption value of both $20 and a "2×" won multiplier (Step 240). These redemption values are stored in the memory of the lottery terminal 14(1). Because instant-type lottery ticket 78 also has play indicia batched with a purchased multiplier of "3×", the payout may be determined to be $120 (2×$20×3) (Step 270). The $120 is disbursed to the lottery player (Step 280). Thereafter, the winning tickets database 56 is updated to reflect that the lottery tickets have been redeemed (6C6) (Step 290).

Another example of an embodiment of the redemption process illustrated in FIG. 8 is now discussed using the example tickets pictured in FIG. 4D. A lottery ticket retailer receives instant-type lottery tickets 80 from a lottery player and enters at least one of the lottery tickets' identifying information into the lottery terminal 14(1) (Step 200). The winning tickets database 56 is queried to determine whether any of the instant-type lottery tickets 80 are winning lottery tickets (Step 210).

Records 6R8 and 6R9 of the winning tickets database 56 are found to include ticket identifier "INST-5555" and "INST-7777", respectively. The redemption status field (6C6) is read to determine whether the winning lottery tickets were previously redeemed (Step 220). Because the instant-type lottery tickets were not previously redeemed, the redemption value field (6C5) is queried for both of the associated instant-type tickets (Step 230). Instant-type lottery ticket "INST-5555" is found to have a "2×" multiplier (Step 240) and instant-type lottery ticket "INST-7777" is found to have a dollar value of $30. These redemption values are stored in the memory of the lottery terminal 14(1).

Although not explicitly illustrated, the method of the present invention could also perform look-ups in the registration database 52 and the winning tickets database 56 to determine whether any other play indicia included in batch "123" included a redemption value. For example the system could confirm that "INST-6666" did not have a won multiplier that should also be applied when determining the payout to the player in Step 270.

Because instant-type lottery tickets 80 have a multiplier, i.e., "INST-5555" has a multiplier of "2×", the payout is determined to be $60 (2×$30) (Step 270). The $60 is disbursed to the lottery player (Step 280). Thereafter, the winning tickets database 56 is updated to reflect that the lottery tickets have been redeemed (6C6) (Step 290).

In addition to the above described embodiments, it is foreseen that lottery ticket multipliers may be used with specific types of lottery tickets such as slow-selling lottery tickets or expensive lottery tickets. Such an embodiment would enable a lottery game provider to sell less popular lottery tickets or would facilitate the introduction of new instant-type lottery games. Furthermore, it is foreseen that lottery ticket multipliers may be used at particular retailer locations. Such an embodiment would encourage customer loyalty at the particular retailer locations.

L. ADDITIONAL EMBODIMENT

In an additional embodiment of the present invention, a multiplier can be distributed independent of a lottery ticket and by a third party other than the lottery retailer. For example, a multiplier can be printed on a receipt from a retail vendor, such as a gas station, along with a lottery promotion message that reads "Play the lottery and if you win, you can multiply your winnings by X" where X is the multiplier. This can be implemented as a promotion by the gas station where the cost of the multiplier is paid for by the gas station. In return, the gas station will enjoy the increased volume that such a multiplier giveaway would generate.

Conversely the lottery retailer could allow the gas station to giveaway the multiplier as a loss leader. The gas station could be compensated for distributing a lottery advertisement including a multiplier for example. In the case of a large retailer with a large customer base, for example, a national home products franchise, a lottery provider may pay a fee to the large retailer in exchange for promoting the lottery game by giving away or selling multipliers to customers via, for example, the retailer's point of sale systems or Internet web sites. Thus, multipliers, in the various forms described herein, may be distributed via merchants (retailer, "e-tailer", distributor, etc.), products (serial numbers, model numbers, etc.), manufacturers (rebate identifiers, coupons, product packaging, product documentation including instructions, etc.), and/or service or product providers (receipts, transaction records, account numbers, advertising material, proofs of purchase, etc.) as a lottery promotion tool or a generic cross-sell product.

M. CONCLUSION

It is clear from the foregoing disclosure that the present system and method for a lottery game player to increase a payout received for the redemption value of a winning lottery ticket provides an advancement in lottery game play. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:
1. A system for providing a lottery game, comprising:
a plurality of lottery terminals, each lottery terminal comprising:
   a first processor; and
   a first storage device in communication with the first processor, the first storage device storing a first program for directing the first processor to:
   receive a request to purchase a set of play indicia for a lottery game and to purchase eligibility for a multiplier for the lottery game,
      in which the multiplier is to be applied to a winning set of play indicia at a first predetermined magnitude if the winning set of play indicia corresponds to a first predetermined specific redemption value, in which the multiplier is to be applied to a winning set of play indicia at a second predetermined magnitude if the winning set of play indicia corresponds to a second predetermined specific redemption value that is different than the first predetermined specific redemption value, wherein the second predetermined magnitude is different than the first predetermined magnitude, in which the multiplier is to be applied to a winning set of play indicia at a third predetermined magnitude if the winning set of play indicia corresponds to a third predetermined specific redemption value that is different than the first predetermined specific redemption value and is different than the second predetermined specific redemption value, wherein the third predetermined magnitude is different than the first predetermined magnitude and is different than the second predetermined magnitude, in which the multiplier is to be applied to a winning set of play indicia at a fourth predetermined magnitude if the winning set of play indicia corresponds to a predetermined range of redemption values, wherein the predetermined range does not include the first, second or third predetermined specific redemption values, and transmit an indication of the request to a lottery server;

and the lottery server in communication via a network with each of the plurality of lottery terminals, the lottery server comprising:
a second processor; and
a second storage device in communication with the second processor, the second storage device storing a second program for directing the second processor to:
receive the indication of the request, and
associate the set of play indicia with the eligibility for the multiplier.

2. The system of claim 1, wherein the fourth predetermined magnitude is equal to the first predetermined magnitude.

3. The system of claim 1, wherein the fourth predetermined magnitude is different than the second predetermined magnitude and is different than the third predetermined magnitude.

4. The system of claim 1, in which the lottery game is a drawing-type lottery game.

5. The system of claim 1, in which the lottery game is an instant-type lottery game.

6. The system of claim 1, the first program including instructions that when executed by the first processor direct the first processor further to:
record the play indicia on a lottery ticket.

7. The system of claim 6, in which the lottery ticket is in the form of at least one of paper, cardboard, plastic, magnetic, optical and electronic medium.

8. The system of claim 1, the first program including instructions that when executed by the first processor direct the first processor further to:
determine that the set of play indicia is a winning set of play indicia; and
determine a payout for the winning set of play indicia by applying the multiplier to a redemption value of the winning set of play indicia.

9. The system of claim 1, the second program including instructions that when executed by the second processor direct the second processor further to:
determine that the set of play indicia is a winning set of play indicia; and determine a payout for the winning set of play indicia by applying the multiplier to a redemption value of the winning set of play indicia.

10. An apparatus comprising:
a processor; and
a storage device in communication with the processor, the storage device storing instructions configured so that when executed by the processor, the instructions direct the processor to:
receive a request by a player to purchase a set of play indicia for a lottery game and to purchase eligibility for a multiplier for the lottery game,
in which the multiplier is to be applied to a winning set of play indicia at a first predetermined magnitude if the winning set of play indicia corresponds to a first predetermined specific redemption value,
in which the multiplier is to be applied to a winning set of play indicia at a second predetermined magnitude if the winning set of play indicia corresponds to a second predetermined specific redemption value that is different than the first predetermined specific redemption value, wherein the second predetermined magnitude is different than the first predetermined magnitude,
in which the multiplier is to be applied to a winning set of play indicia at a third predetermined magnitude if the winning set of play indicia corresponds to a third predetermined specific redemption value that is different than the first predetermined specific redemption value and is different than the second predetermined specific redemption value, wherein the third predetermined magnitude is different than the first predetermined magnitude and is different than the second predetermined magnitude,
in which the multiplier is to be applied to a winning set of play indicia at a fourth predetermined magnitude if the winning set of play indicia corresponds to a predetermined range of redemption values, wherein the predetermined range does not include the first, second or third predetermined specific redemption values; and
store an indication of the set of play indicia of the player in association with the eligibility of the player for the multiplier.

11. The apparatus of claim 10, the instructions being further configured so that when executed by the processor the instructions direct the processor further to:
determine that the set of play indicia of the player is a winning set of play indicia; and
determine a payout for the winning set of play indicia by applying the multiplier to a redemption value of the winning set of play indicia.

12. An apparatus comprising:
a processor; and
a storage device in communication with the processor, the storage device storing instructions configured so that when executed by the processor, the instructions direct the processor to:
receive an indication of a request to redeem a set of play indicia for a lottery game;
determine the set of play indicia is associated with eligibility for a multiplier for the lottery game;
determine that the set of play indicia is a winning set of play indicia;
determine a payout for the winning set of play indicia based a redemption value of the winning set of play indicia and the multiplier, by applying the multiplier at a first predetermined magnitude to the redemption value if the redemption value is a first predetermined specific redemption value, by applying the multiplier at a second predetermined magnitude to the redemption value if the redemption value is a second predetermined specific redemption value that is different than the first predetermined specific redemption value, wherein the second predetermined magnitude is different than the first predetermined magnitude, by applying the multiplier at a third predetermined magnitude to the redemption value if the redemption value is a third predetermined specific redemption value that is different than the first predetermined specific redemption value and is different than the second predetermined specific value, wherein the third predetermined magnitude is different than the first predetermined magnitude and is different than the second predetermined magnitude, or by applying the multiplier at a fourth predetermined magnitude to the redemption value if the redemption value is in a predetermined range of specific redemption values, wherein the predetermined range of specific redemption values does not include the first, second or third predetermined specific redemption values; and outputting an indication of the payout for the winning set of play indicia.

13. The apparatus of claim 12, wherein the fourth predetermined magnitude is equal to the first predetermined magnitude.

14. The apparatus of claim 12, wherein the fourth predetermined magnitude is different than the second predetermined magnitude and is different than the third predetermined magnitude.

* * * * *